(12) United States Patent  (10) Patent No.: US 7,397,511 B2
Ezawa  (45) Date of Patent: Jul. 8, 2008

(54) INFORMATION TERMINAL DEVICE

(75) Inventor: Masayuki Ezawa, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 690 days.

(21) Appl. No.: 10/754,507

(22) Filed: Jan. 12, 2004

(65) Prior Publication Data
US 2004/0141064 A1 Jul. 22, 2004

(30) Foreign Application Priority Data
Jan. 16, 2003 (JP) .............................. 2003-008815

(51) Int. Cl.
H04N 5/225 (2006.01)
H04M 1/00 (2006.01)
(52) U.S. Cl. .................................... 348/373; 455/575.3
(58) Field of Classification Search ......... 348/373–376, 348/46–50; 455/575.1, 575.3
See application file for complete search history.

(56) References Cited

U.S. PATENT DOCUMENTS 3,045,573 A * 7/1962 Wanner ....................... 396/325
5,719,799 A * 2/1998 Isashi ......................... 708/105
5,729,781 A   3/1998 Warren
5,978,143 A * 11/1999 Spruck ........................ 359/619
7,139,473 B2 * 11/2006 Shimano et al. .............. 396/73
7,173,665 B2 * 2/2007 Kawasaki et al. ........... 348/376
7,190,389 B1   3/2007 Abe et al.
2001/0004269 A1 * 6/2001 Shibata et al. ......... 348/333.06
2001/0051509 A1   12/2001 Mukai et al.
2003/0109232 A1 * 6/2003 Park et al. ...................... 455/90
2004/0012851 A1   1/2004 Sato et al.
2004/0090552 A1 * 5/2004 Watanabe et al. ........... 348/373
2004/0095500 A1 * 5/2004 Sato et al. ................... 348/340
2004/0100575 A1 * 5/2004 Malzbender ................ 348/375
2004/0130658 A1 * 7/2004 Yamaguchi et al. ......... 348/375
2004/0233275 A1 * 11/2004 Tomita ........................ 348/51

FOREIGN PATENT DOCUMENTS

| | | |
|---|---|---|
| GB | 2394850 A | 5/2004 |
| JP | 7-209775 A | 8/1995 |
| JP | 10-108152 | 4/1998 |
| JP | 11-055693 | 2/1999 |
| JP | 2001-22014 A | 1/2001 |
| JP | 2001-136254 A | 5/2001 |
| JP | 2001-352380 A | 12/2001 |
| JP | 2002-295445 A | 10/2002 |
| JP | 2003-51872 A | 2/2003 |
| JP | 2003051872 A * | 2/2003 |
| KR | 2003-00201418 A | 3/2003 |

* cited by examiner

Primary Examiner—Lin Ye
Assistant Examiner—Timothy J Henn
(74) Attorney, Agent, or Firm—Birch, Stewart, Kolasch & Birch, LLP

(57) ABSTRACT

In a folding information terminal device capable of taking a three-dimensional image and including two planes which become opposite to each other when the folding information terminal device is folded; there is provided at least one image pickup section on one plane of the two planes, and at least one image pickup section on the other plane.

13 Claims, 16 Drawing Sheets

PRIOR ART

INFORMATION TERMINAL DEVICE

This Nonprovisional application claims priority under 35 U.S.C. § 119(a) on Patent Application No. 2003/008815 filed in Japan on Jan. 16, 2003, the entire contents of which are hereby incorporated by reference.

FIELD OF THE INVENTION

The present invention relates to an information terminal device capable of taking and displaying a three-dimensional image.

BACKGROUND OF THE INVENTION

Conventionally, a three-dimensional image display device for displaying a three-dimensional image has been used for various purposes, such as computer games, CAD systems, airplanes, and medical devices etc. The following explains a typical principle for providing a user with a three-dimensional image.

Display of a three-dimensional image is carried out by capturing an image at plural different angles, and then displaying the plurality of captured images with parallax with respect to both eyes of the user. Accordingly, when capturing image data for performing three-dimensional image display, a plurality of image pickup sections are placed at different positions so that shooting directions (light axes) of the respective image pickup sections intersect with each other on the object of shooting. The following describes three typical methods for offering a three-dimensional image to the user in this manner.

In the first method, with a general image display device, a red image is displayed to the right eye of the user, and a blue image is displayed to the left eye of the user. In the meantime, the user wears glasses with a blue film for the right eye and a red film for the left eye so that the right eye of the user sees only the red image while the left eye of the user sees only the blue image. While the user sees the blue image with the left eye and sees the red image with the right eye, he/she also recognizes a plurality of images with parallax. As a result, the user sees a three-dimensional image by optical deception.

In the second method, two image display devices are used respectively for the right eye and for the left eye, provided with in front thereof polarization plates whose polarizing directions intersect with each other. Then, the images from these image display devices for the right eye and for the left eye with different polarizing conditions are unified by a half mirror. Meanwhile, the user wears glasses with separate polarization plates for the right eye and the left eye, whose polarizing directions intersect with each other, so that the right eye of the user sees only the image from the image display device for the left eye while the left eye of the user sees only the image from the image display device for the right eye. As a result, the right eye and the left eye of the user individually see images different in polarizing condition, so that the user sees a three-dimensional image by optical deception.

In the third method, with a general image display device, plural images with parallax are displayed in turn at certain time intervals. Meanwhile, the user wears glasses with shutters which open and close at the time intervals identical and synchronized with the time intervals above for switching the plural images. As a result, the right eye and the left eye of the user individually see images different in parallax, so that the user sees a three-dimensional image by optical deception.

As an example of such display devices for taking and displaying a three-dimensional image, Japanese Laid-Open Patent Application Tokukaihei 11-55693/1999 (published on Feb. 26, 1999) discloses a still image camera including a plurality of image pickup sections. In this device, the plurality of image pickup sections simultaneously film the same object so as to take and display a three-dimensional image.

Incidentally, as with the folding image information terminal device shown in FIG. 14, a typical conventional information terminal device is made up of a display section 101 with a display 100, and an operation section 103 with an operation button 102. With this structure, Japanese Laid-Open Patent Application Tokukaihei 10-108152/1998 (published on Apr. 24, 1998) realizes an image information terminal device for taking and displaying a three-dimensional image, by providing, as shown in FIG. 14, a plurality of image pickup sections 104 and 105 in the display section 101 having the display 100.

However, to capture an object of three-dimensional display, it is necessary to capture a plurality of images of one object with parallax of certain extent. For this reason, the respective image pickup sections for capturing a three-dimensional image are preferably placed with a specific distance. Generally, it is preferable to determine this distance to be similar to the interval between both eyes of a human.

Here, in the structure shown in FIG. 14, the image pickup sections 104 and 105 are provided in the display section 101. However, in case of adopting such a folding information terminal device for a small-sized device such as a mobile phone, there arise some mechanical difficulties to place the image pickup sections 104 and 105 in the display section 101, while providing a specific distance between them. Further, for a conventional folding information terminal device, the arrangement of providing image pickup sections with a specific distance has not been realized in any sizes of device.

SUMMARY OF THE INVENTION

An object of the present invention is to provide a folding information terminal device capable of taking and displaying a superior three-dimensional image than that taken by a conventional folding information terminal device. The object is achieved with a folding information terminal device for taking a three-dimensional image, in which the respective image pickup sections for capturing a three-dimensional image are provided with a longer interval than a conventional folding information terminal device for taking a three-dimensional image.

In order to solve the foregoing problems, a folding information terminal device according to the present invention, which is capable of taking a three-dimensional image and including two planes which become opposite to each other when the folding information terminal device is folded, includes at least one image pickup section on one plane of the two planes; and at least one image pickup section on the other plane.

With the foregoing arrangement, the folding information terminal device, which has two planes, includes a plurality of image pickup sections, as at least one image pickup section is provided on one plane, and at least one image pickup section is provided on the other plane. Therefore, the information terminal device is capable of simultaneously taking the same object with a plurality of image pickup sections at different positions. More specifically, a plurality pieces of image data with parallax regarding the same object can be captured to the information terminal device, thus enabling the information terminal device to take a three-dimensional image.

Further, the information terminal device includes at least one image pickup section on one plane of the two planes and at least one image pickup section on the other plane of the two planes, which become opposite to each other when the folding information terminal device is folded. With such a structure, the interval between the respective image pickup sections can be extended, compared to the conventional structure in which the image pickup sections are provided only on the display section (only on one plane), thus capturing a plurality pieces of image data with larger parallax than that of a conventional information terminal device. On this account, it is possible to capture a superior three-dimensional image than that captured by a conventional device.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

Figure 1:
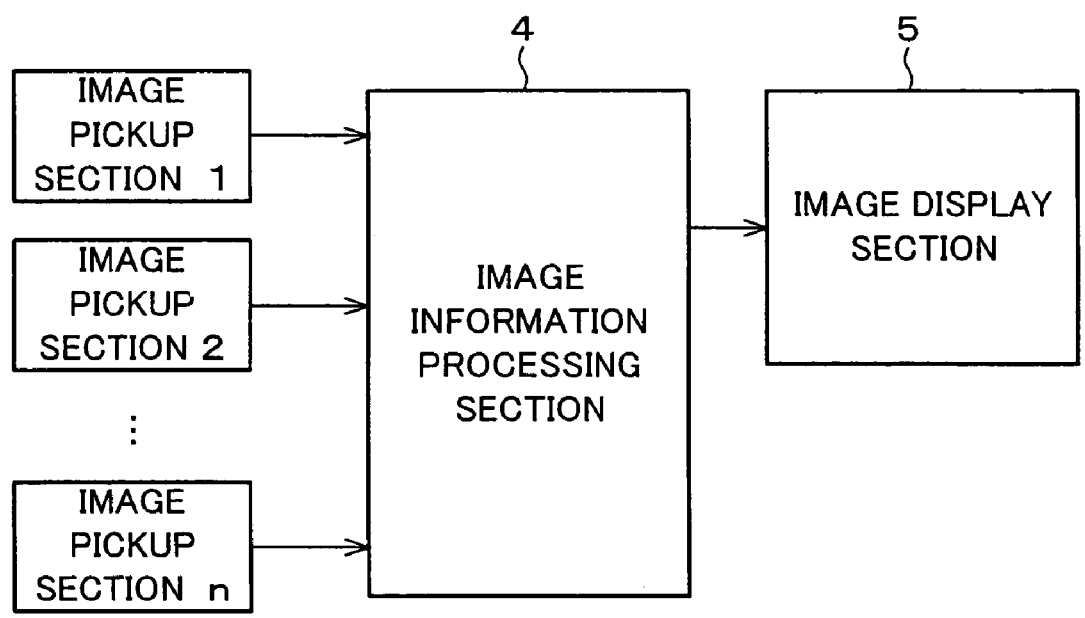
FIG. 1 is a block diagram illustrating a three-dimensional image display system included in an information terminal device according to one embodiment of the present invention.

One embodiment of the present invention will be described below with reference to Figures. FIG. 1 is a block diagram illustrating a three-dimensional image display system included in an information terminal device according to the present embodiment.

As shown in FIG. 1, the information terminal device includes a plurality of image pickup sections 1 through n. The image pickup sections are each made of a CCD camera or a CMOS image sensor. Note that, at least one of the image pickup sections is required for each of a covering body and a main body of the information terminal device (i.e., at least two in total).

An image information processing section 4 is a block for converting the image data, which has been taken by the image pickup sections 1 through n, into image data compatible with the display mode of an image display section 5.

Note that, when the information terminal device has two image pickup sections, the image information processing section 4 outputs image data of red color component and image data of blue color component. Further, when the information terminal device has three image pickup sections, the image information processing section 4 outputs image data of red color component, image data of blue color component, and image data of green color component. Namely, the image information processing section 4 outputs plural pieces of image data of the same number as that of image pickup sections; and these pieces of data have different color components.

The image display section 5 is a monitor for displaying plural images to a user, based on the plural pieces of image data transmitted from the image information processing section 4, so as to provide the user with a three-dimensional image caused by optical deception. The image display section 5 is made of a 3D liquid crystal, or a CRT. The 3D liquid crystal enables the user to see a three-dimensional image by optical deception without using glasses; on the other hand, the CRT enables the user to see a three-dimensional image by optical deception by using glasses. Note that, the image display section 5 is capable of displaying not only a three-dimensional image but also a two-dimensional image.

The following will explain a concrete example of the foregoing information terminal device. In this example, the covering body and the main body of the information terminal device each include one image pickup section.

Figure 2:
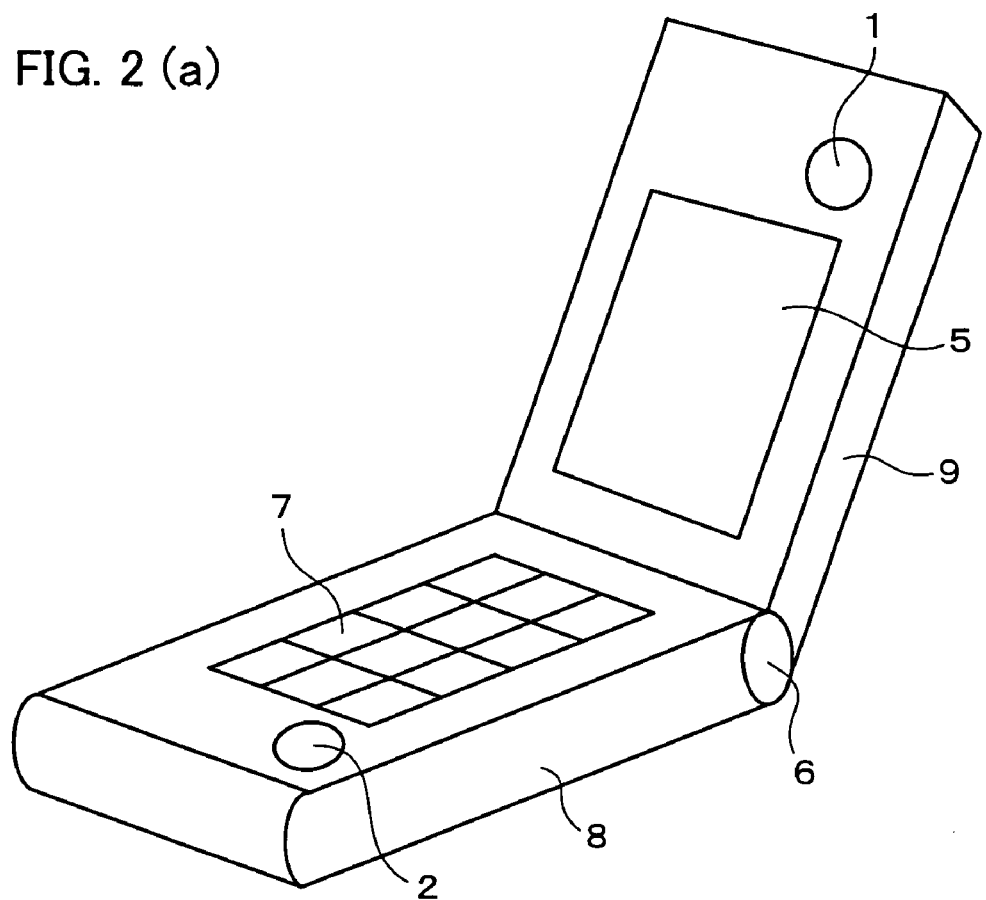
FIG. 2(a) is a perspective view illustrating the outer shape of the information terminal device of FIG. 1 in an opened state.
FIG. 2(b) is a perspective view illustrating the outer shape of the information terminal device of FIG. 1 in a closed state.
Figure 2:
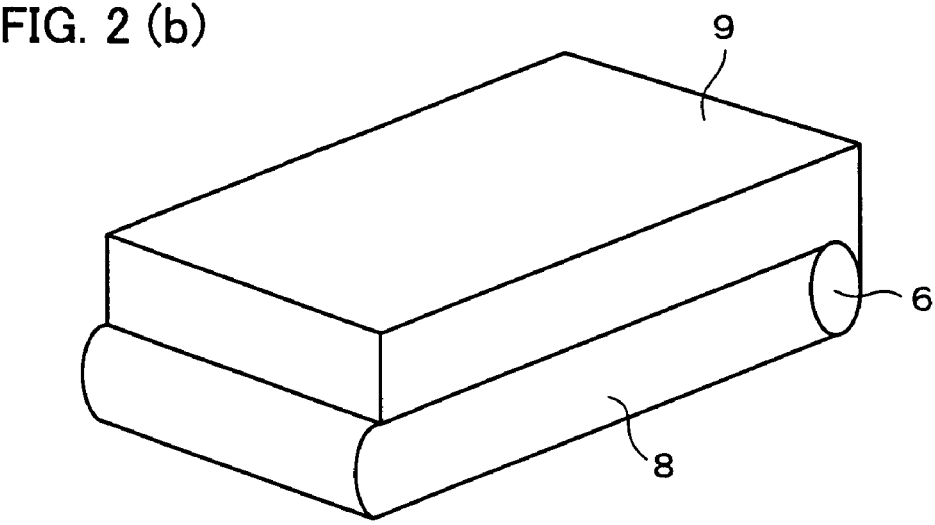

FIG. 2(*a*) is a perspective view illustrating the outer shape of an information terminal device in which a main body 8 and a covering body 9 each include one image pickup section. The information processing device of FIG. 2(*a*) is made up of the main body 8 including an operation button 7, and the covering body 9 including an image display section 5, by connecting a fixed end of the main body 8 and a fixed end of the covering body 9 with a movable connection section 6 as a hinge. Hereinafter, that side of the main body 8 on which the operation button 7 is provided is referred to as a front surface of the main body 8; and the opposite side (that side on which the operation button 7 is not provided) of the front surface is referred to as a rear surface the main body 8. Similarly, that side of the covering body 9 on which the image display section 5 is provided is referred to as a front surface of the covering body 9; and the opposite side (that side on which the image display section 5 is not provided) of the front surface is referred to as a rear surface the covering body 9.

Further, as shown in FIG. 2(*b*), the information terminal device can be closed by rotating the main body 8 and the covering body 9 about the movable connection section 6 so that a free end of the main body 8 and a free end of the covering body 9 are in contact with each other.

Here, as shown in FIG. 2(*a*), the information terminal device includes an image pickup section 1 for capturing an image to be displayed with respect to the right eye of the user on the free end of the front surface of the covering body 9 (one plane, the other plane), and also includes an image pickup section 2 for capturing an image to be displayed with respect to the left eye of the user on the free end of the front surface of the main body 8 (one plane, the other plane). The image pickup section 1 may also be provided on the free end of the front surface of the main body 8, and the image pickup section 2 may also be provided on the free end of the front surface of the covering body 9.

Next, the following will explain an operation for capturing a three-dimensional image in the information terminal device. When the information terminal device is closed as shown in FIG. 2(*b*), the image pickup section 1 and the image pickup section 2 cannot take the same object, thus failing to obtain a three-dimensional image.

Then, when the information terminal device is opened by rotating the covering body 9 about the movable connection section 6, there is created a certain distance between the image pickup section 1 and the image pickup section 2, and also the shooting direction (light axis) of the image pickup section 1 and the shooting direction of the image pickup section 2 (FIG. 4) intersect with each other. This structure enables capture of two images with parallax from the same object respectively by the image pickup section 1 and the image pickup section 2 in different positions, thus enabling the information terminal device to take a three-dimensional image.

Further, the movable connection section 6 includes a simple stopper mechanism so as to movably hold inclination of the covering body 9 with respect to the main body 8 at an arbitrary angle. This structure enables the information terminal device to arbitrary control the interval between the image pickup section 1 and the image pickup section 2, and the respective shooting directions of the image pickup sections 1 and 2. Therefore, it is possible to change vision of the user, so that the user sees different kinds of three-dimensional image. Note that, one possible example of the simple stopper mechanism is made of a spring, which movably holds the inclination of the covering body 9 with respect to the main body 8 at an arbitrary angle by biasing force.

Further, the foregoing example describes a structure in which the covering body 9 and the main body 8 of the information terminal device each include one image pickup section (two in total). However, the number of the image pickup sections may be changed as long as the covering body 9 and the main body 8 of the information terminal device each include al least one image pickup section (two in total).

As described, the folding information terminal device according to the present embodiment includes the image pickup section 2 of the front surface of the main body 8, and also includes the image pickup section 1 of the front surface of the covering body 9. Namely, one information terminal device includes a plurality of image pickup sections. With this structure, it is possible to simultaneously take plural images of the same object by plural image pickup sections provided at different positions. Consequently, the information terminal device can capture plural pieces of image data with parallax from the same object, thus enabling the information terminal device to take a three-dimensional image.

Figure 14:
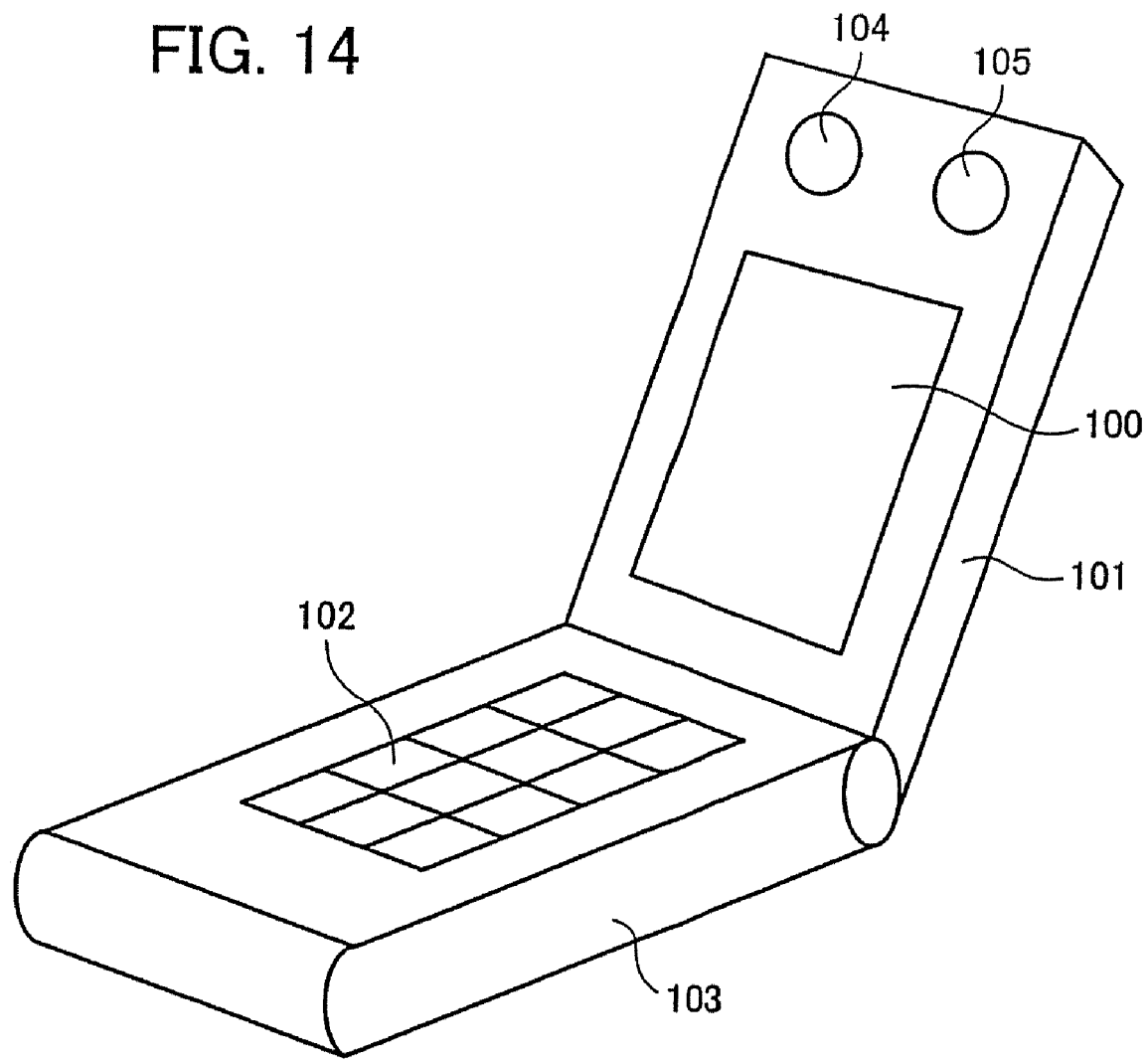
FIG. 14 is a perspective view illustrating a conventional folding information terminal device.

Further, in the foregoing example, the plural image pickup sections are respectively provided on the surface of the main body 8 and on the surface of the covering body 9, which are opposed in a closed state. With this structure, a greater interval can be provided between the respective image pickup sections than that of the conventional structure shown in FIG. 14. Accordingly, this information terminal device can capture plural pieces of image data with a greater parallax, compared to the conventional information terminal device. Thus, it is possible to capture a superior three-dimensional image than that captured by the conventional device.

Further, in the present embodiment, the plural image pickup sections are respectively provided on the free end of the surface of the main body 8 and on the free end of the surface of the covering body 9. With this structure, the interval between the respective image pickup sections is substantially identical to the length of the information terminal device in the opened state. Therefore, it is possible to maximally ensure the interval between the respective image pickup sections, in the folding information terminal device.

Further, in the present embodiment, the information terminal device includes the movable connection section 6 for connecting the fixed end of the main body 8 and the fixed end of the covering body 9. This structure enables the information terminal device to arbitrary control the inclination of the covering body 9 with respect to the main body 8. Further, it is possible to arbitrary control the interval between the image pickup sections 1 and 2 on both sides, as well as the respective shooting directions from the image pickup sections 1 and 2. Therefore, the parallax of the images captured by the image pickup sections 1 and 2 can be adjusted, thus changing vision of the user so that the user sees different kinds of three-dimensional image.

Note that, the foregoing information terminal device includes the image information processing section 4 and the image display section 5; however, the present invention allows omission of the image information processing section 4 and the image display section 5. In this case, the plural pieces of image data captured by the image pickup sections 1 and 2 are transmitted via the Internet to a PC including an image information processing section, so as to carry out image processing of a three-dimensional image in the PC.

Note that, the concept of the present invention can be adopted for a folding information terminal device, such as a folding mobile phone, a folding PHS (Personal Handyphone System), a folding PDA (Personal Digital Assistant), a folding laptop computer etc. The effect of the present invention becomes more significant as the size of information terminal device decreases. This is because, in a smaller information terminal device, the area of one plane (or the other plane) of the device also becomes smaller. Thus, it is not possible to provide a sufficient interval between the respective image pickup sections when the image pickup sections are provided on one plane of the device.

Second Embodiment

Figure 3:
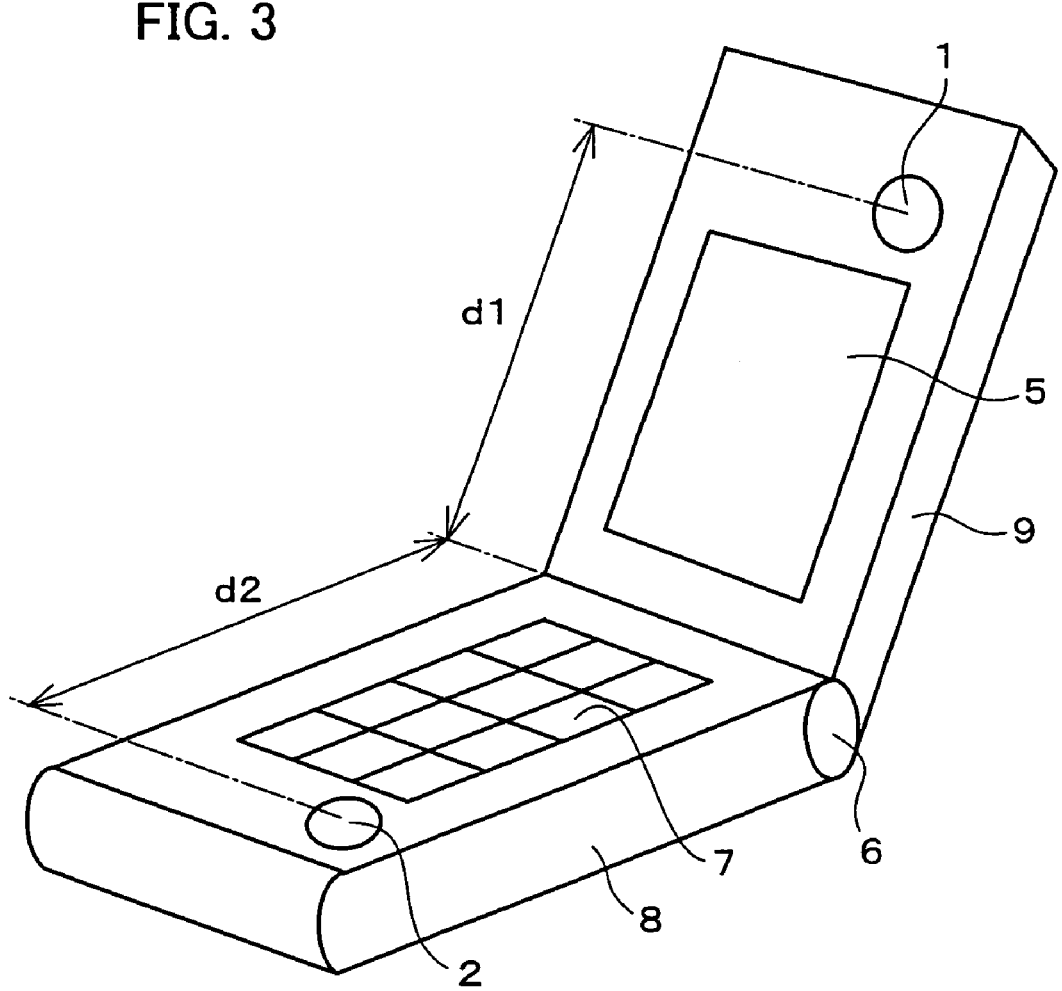
FIG. 3 is a perspective view illustrating the outer shape of an information terminal device according to another embodiment of the present invention, in which the respective image pickup sections have the same distance to the movable connection section.
Figure 4:
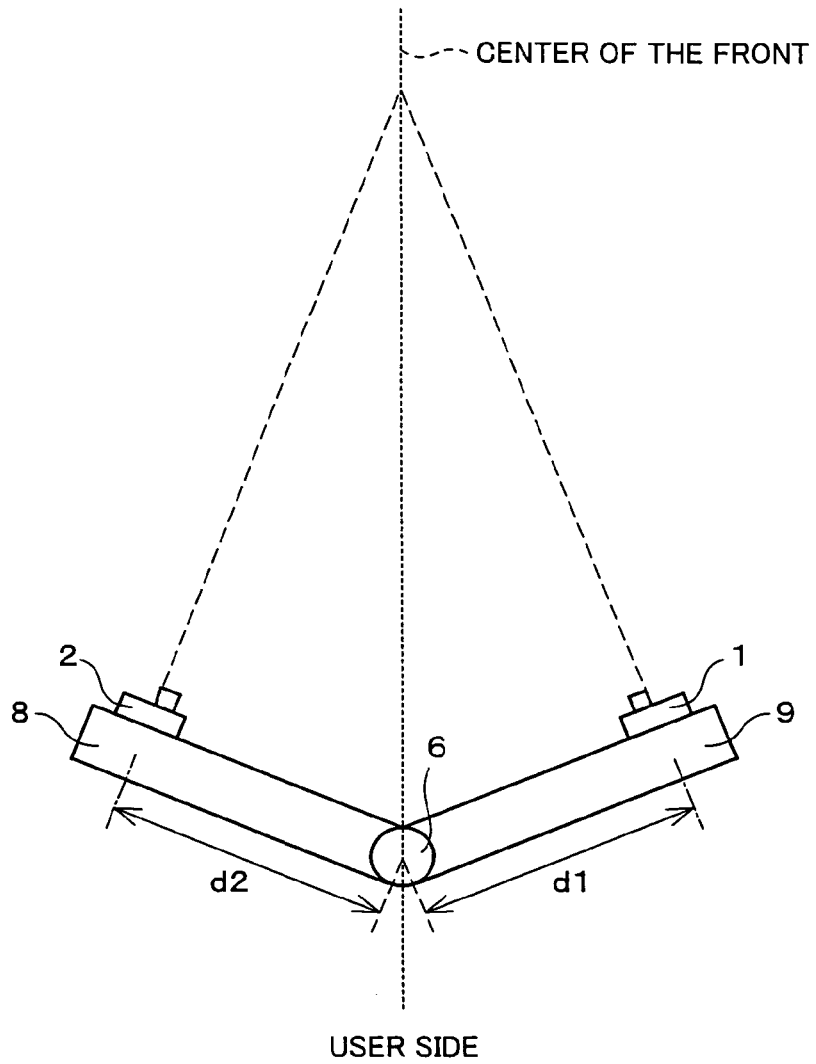
FIG. 4 is a side view of the information terminal device shown in FIG. 3.

Another embodiment of the present invention will be described below with reference to figures. FIG. 3 is a perspective view illustrating the outer shape of an information terminal device according to the present embodiment. FIG. 4 shows a side view of the information terminal device. This information terminal device according to the present embodiment includes the image pickup section 1 and the image pickup section 2, which are provided so that the distance d1 between the image pickup section 1 and the movable connection section 6, and the distance d2 between the image pickup section 2 and the movable connection section 6 are identical. With this structure, as shown in FIG. 4, the user can set the intersection of the shooting direction of the image pickup section 1 and the shooting direction of the image pickup section 2 to be placed on the center of the front side of the information terminal device and the user, by holding the information terminal device with the surface of the main body 8 and the surface of the covering body 9 facing the object. This allows the user to shoot an object in the center of the front side of the information terminal device and the user, thus enabling the user to more intuitively shoot the object.

More specifically, with this structure in which the distance d1 between the image pickup section 1 and the movable connection section 6, and the distance d2 between the image pickup section 2 and the movable connection section 6 are identical, the user can adjust the intersection of the shooting direction of the image pickup section 1 and the shooting direction of the image pickup section 2 to be opposite to the movable connection section 6 by holding the information terminal device with the surface of the main body 8 and the surface of the covering body 9 facing the object. In this manner, the object is placed in the center of the front side of the information terminal device and the user, thus enabling the user to more intuitively shoot the object.

Third Embodiment

Figure 5:
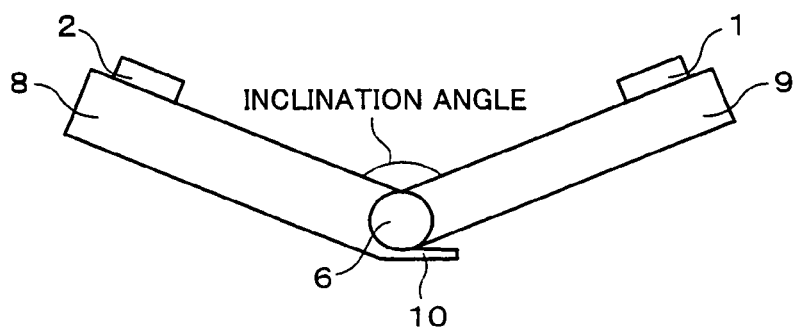
FIG. 5 is a side view of an information terminal device according to still another embodiment of the present invention, which includes a movable range restriction section.

Still another embodiment of the present invention will be described below with reference to figures. FIG. 5 is a side view illustrating the outer shape of an information terminal device according to the present embodiment. In addition to the arrangement described in First Embodiment and Second Embodiment, the information terminal device of the present embodiment further includes a movable range restriction section 10 on the main body 8. The movable range restriction section 10 is protruded from the rear surface of the main body 8. The movable range restriction section 10 is brought into contact with the rear surface of the covering body 9 when the inclination of the covering body 9 with respect to the main body 8 becomes a predetermined angle, so as to prevent the inclination of the covering body 9 with respect to the main body 8 from exceeding the predetermined angle (so as to stop the movable connection section 6 before exceeding the predetermined angle).

Incidentally, when the angle of inclination excessively increases (close to 180°) in picturing a three-dimensional image by the image pickup section 2 of the main body 8 and the image pickup section 1 of the covering body 9, the intersection of the shooting direction of the image pickup section 1 and the shooting direction of the image pickup section 2 will be largely distant from the information terminal device. Here, if the distance from the image pickup section 1 or 2 and the intersection exceeds the allowable shooting range, the information terminal device can no longer film a three-dimensional image. In view of this problem, by providing the movable range restriction section 10 in the information terminal device, it is possible to prevent the inclination of the covering body 9 with respect to the main body 8 from exceeding the predetermined angle, thus preventing the information terminal device from failing to shoot a three-dimensional image.

Note that, the movable range restriction section 10 is provided on the main body 8 in the example of FIG. 5; however, it may be provided on the covering body 9.

Figure 17:
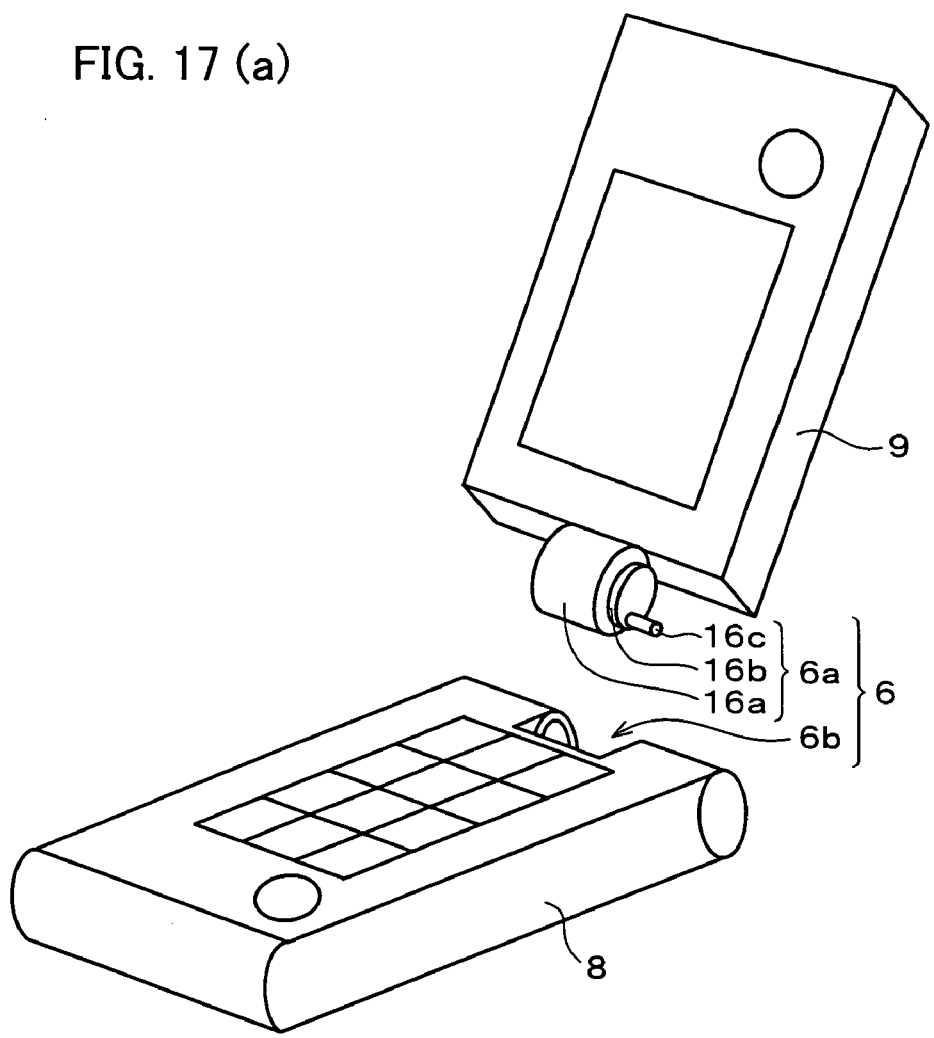
FIG. 17(a) is a perspective view illustrating a male hinge section and a female hinge section for constituting a movable connection section of an information terminal device, in which the movable connection section is formed from a hinge having a movable range restriction section.
FIG. 17(b) is a side view illustrating the female hinge section.
Figure 17:
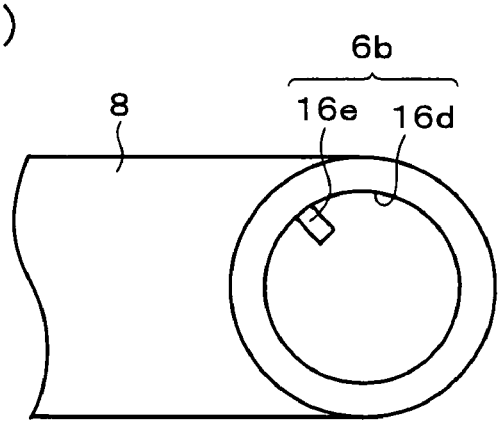

Further, the movable range restriction section 10 may be provided on the movable connection section 6. The following describes an example of this structure. As shown in FIG. 17(a), the movable connection section 6 as a hinge is made up of a male hinge section 6a attached to the fixed end of the covering body 9, and a female hinge section 6b attached to the fixed end of the main body 8.

The male hinge section 6a is made up of a cylinder member 16a, a small cylinder member 16b extending from the cylinder member 16a, and a protrusion pin 16c formed on the small cylinder member 16b.

As shown in FIG. 17(b), the female hinge section 6b is made up of a concave section 16d and a latching section 16e. The concave section 16d is where the small cylinder member 16b is rotatably inserted, and the latching section 16e latches the protrusion pin 16c when the small cylinder member 16b is rotated inside the female hinge section 6b.

With this structure, the latching section 16e latches the protrusion pin 16c, and therefore, the angle of inclination of the covering body 9 with respect to the main body 8 is restricted within a predetermined range. Accordingly, in the structure shown in FIGS. 17(a) and 17(b), the protrusion pin 16c and the latching section 16e constitute a movable range restriction section.

As described, the information terminal device according to the present embodiment includes either the movable range restriction section 10, or a movable range restriction section made up of the protrusion pin 16c and the latching section 16e, so as to restrict the angle of inclination within a predetermined range. With this structure, the angle of inclination can be restricted so as to ensure intersection of the shooting direction of the image pickup section 1 and the shooting direction of the image pickup section 2. Therefore, since the shooting direction of the image pickup section 1 and the shooting direction of the image pickup section 2 securely intersect with each other, it is possible to prevent the information terminal device from failing to shoot a three-dimensional image.

Fourth Embodiment

Figure 6:
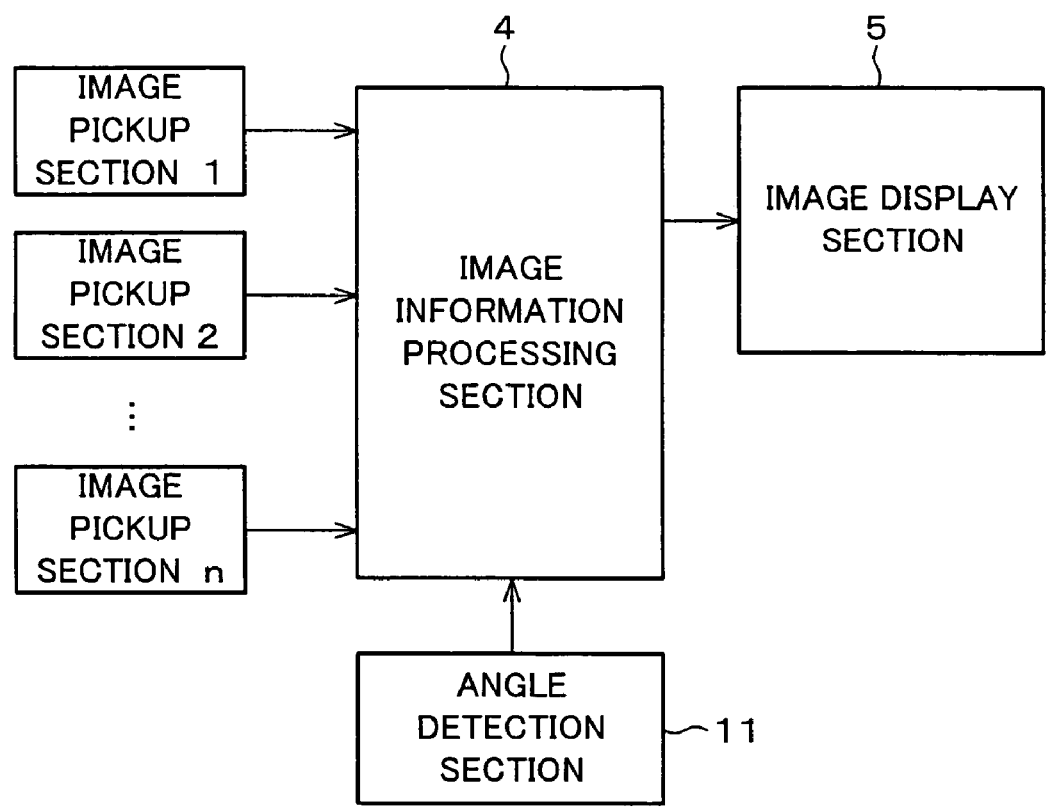
FIG. 6 is a block diagram illustrating a three-dimensional image display system of an information terminal device according to yet another embodiment of the present invention, which includes an angle detection section.

Yet another embodiment of the present invention will be described below with reference to figures. FIG. 6 is a block diagram illustrating a three-dimensional image display system of an information terminal device according to the present embodiment. In addition to the arrangement described in Second Embodiment, the information terminal device of the present embodiment further includes an angle detection section 11. The angle detection section 11 is a block for calculating the angle of inclination of the covering body 9 with respect to the main body 8. The angle detection section 11 is connected to the image information processing section 4, so as to transmit information regarding the angle of inclination to the image display section 5 via the image information processing section 4.

When the angle of inclination excessively increases (close to 180°) in picturing a three-dimensional image by the image pickup section 2 and the image pickup section 1, the distance from the intersection of the shooting direction of the image pickup section 1 and the shooting direction of the image pickup section 2 to the information terminal device is largely extended. Thus, the shooting distance may fall outside the suitable shooting distance for picturing a three-dimensional image. Further, the shooting distance may also fall outside the allowable shooting distance from the respective image pickup sections. Accordingly, the structure in which the distance from the intersection to the information terminal device is largely extended is not suitable for three-dimensional display.

On the other hand, when the angle of inclination excessively decreases, the distance from the intersection of the shooting direction of the image pickup section 1 and the shooting direction of the image pickup section 2 to the information terminal device is reduced. Thus, the shooting distance may be excessively reduced, and may fall out of an appropriate shooting range for picturing a three-dimensional image. Further, when the angle created at the intersection of the shooting direction of the image pickup section 1 and the shooting direction of the image pickup section 2 excessively increases, parallax between an image taken by the image pickup section 1 and an image taken by the image pickup section 2 become excessively significant, thus arising some difficulties when taking a three-dimensional image.

In order to prevent failure of shooting caused by such factors, the information terminal device according to the present embodiment includes the angle detection section 11 for obtaining information regarding the angle of inclination. Then, when the angle of inclination falls outside a predetermined allowable range, i.e., when the angle of inclination of the covering body 9 with respect to the main body 8 excessively increases or excessively decreases, the angle detection section 11 transmits information to the image information processing section 4 so as to indicate that the angle of inclination is not suitable for taking a three-dimensional image. This information is further provided to the user via the image display section 5.

Here, the allowable angle range (the suitable angle of inclination of the covering body 9 with respect to the main body 8 for three-dimensional display) depends on the allowable shooting distance of the image pickup sections 1 and 2, and the distance from the image pickup section 1 or 2 to the movable connection section 6. The following will explain a method of determining the allowable angle range with reference to FIG. 7.

Figure 7:
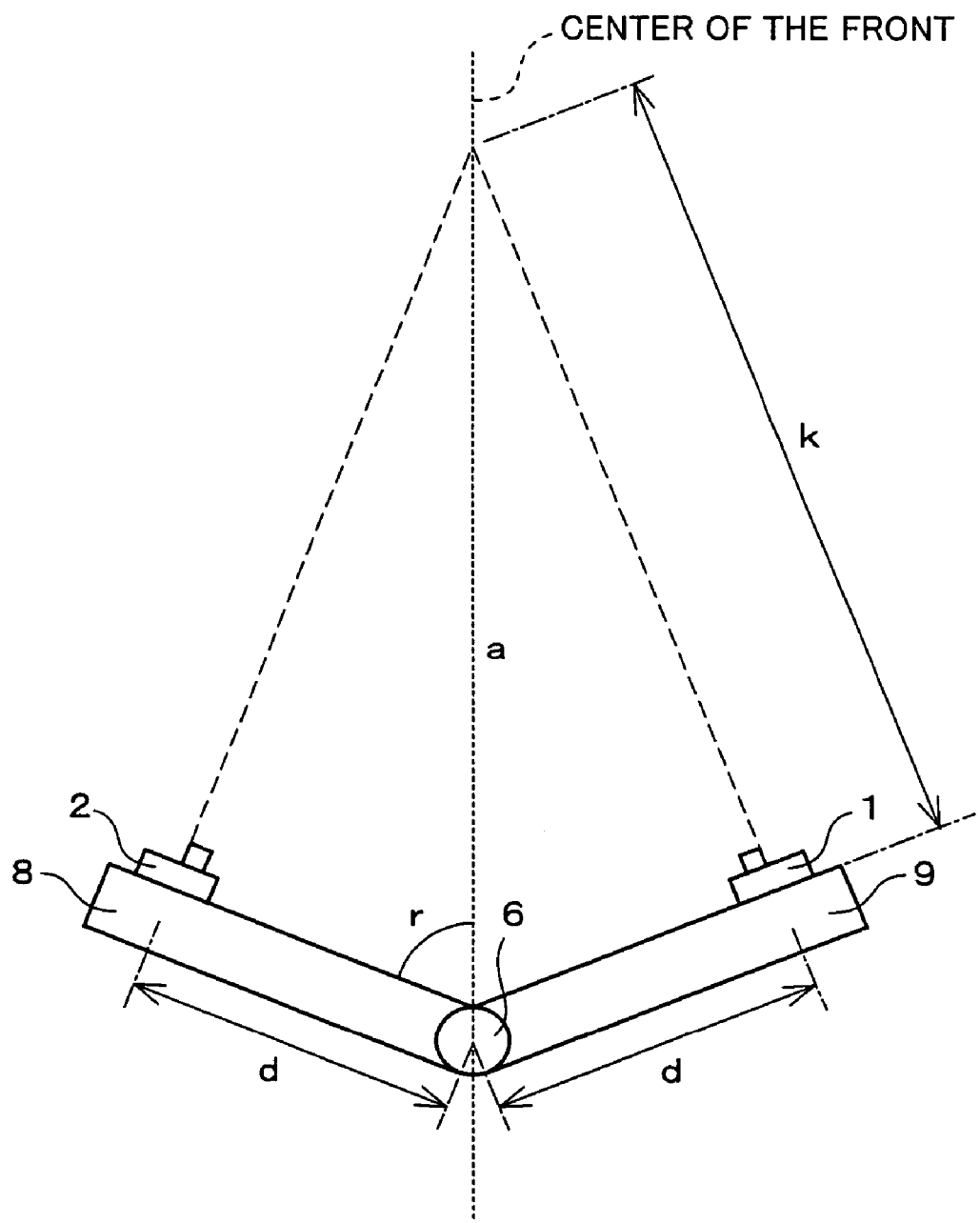
FIG. 7 is a side view of the information terminal device shown in FIG. 6.

The information terminal device of the present embodiment is constituted so that the distance between the image pickup section 1 and the movable connection section 6, and the distance between the image pickup section 2 and the movable connection section 6 are identical. Here, as shown in FIG. 7, the distance between the image pickup section 1 and the movable connection section 6, and the distance between the image pickup section 2 and the movable connection section 6 are both denoted as d. Further, the distance from the intersection of the shooting direction of the image pickup section 1 and the shooting direction of the image pickup section 2 to the image pickup section 1 or 2 is denoted as k. Further, the angle created by a leading line a and the main body 8 is denoted as r. Here, the leading line a is a line for connecting the intersection (the center of the front side of the information terminal device) and the movable connection section 6. Accordingly, the angle of inclination is 2r in this structure. Further, when the allowable shooting range of the image pickup sections 1 and 2 is in a range between the minimum value kmin and the maximum value kmax, d and r have to satisfy the following formula.

$$k\min \leq d \tan r \leq k\max$$

Further, d is a specific value (fixed value) of the information terminal device as it depends on the position of the image pickup section 1 with respect to the covering body 9 and the position of the image pickup section 2 with respect to the main body 8. Then, since the angle of inclination of the covering body 9 with respect to the main body 8 is 2r, the allowable angle range may be expressed as follows.

$$2\arctan(k\min/d) \leq 2r \leq 2\arctan(k\max/d)$$

Figure 8:
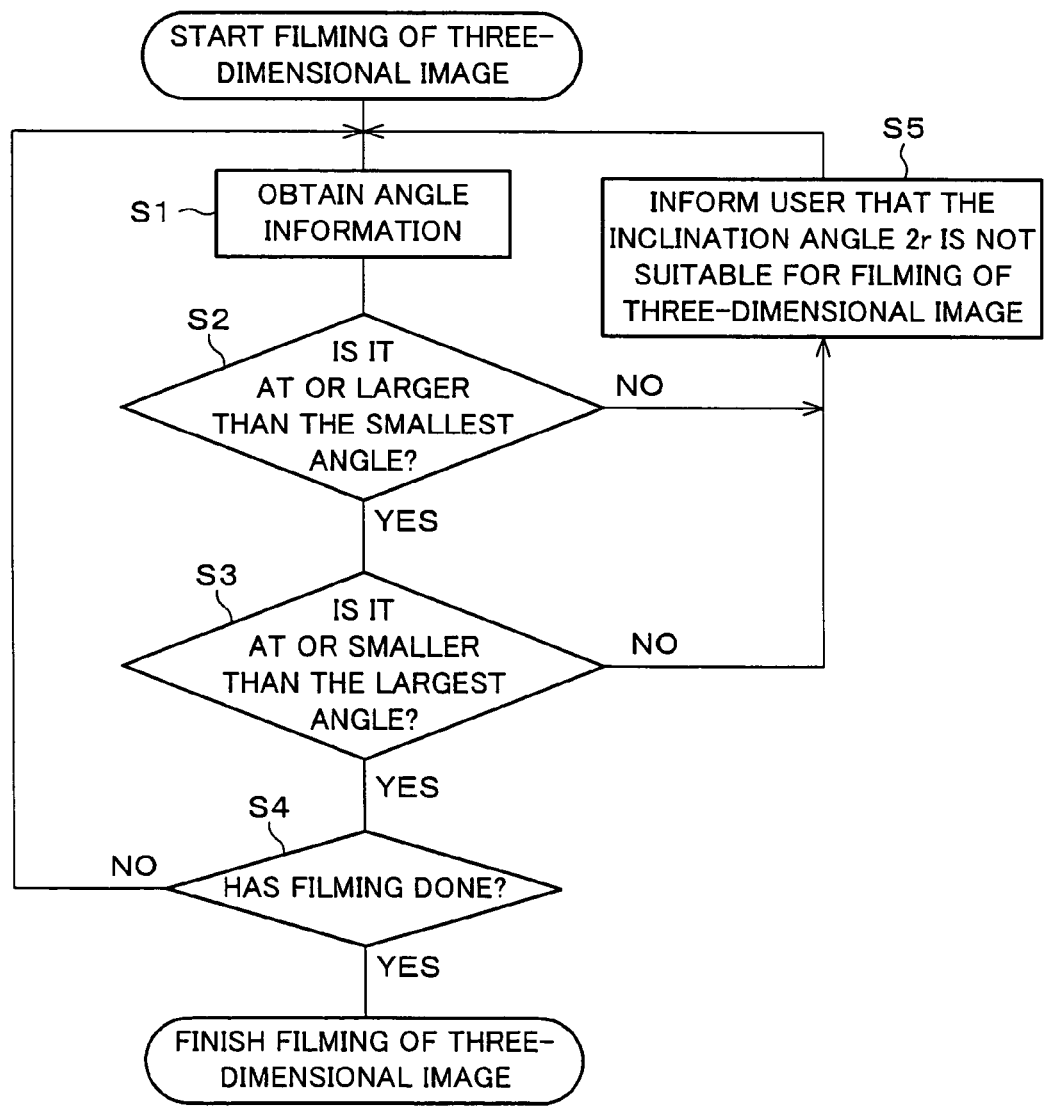
FIG. 8(a) is a table showing an allowable angle range for the information terminal device shown in FIG. 6.
FIG. 8(b) is an example of modification of the table of FIG. 8(a), which is changed according to user's preference.
FIG. 8(c) is a flow chart showing procedures of the respective operations carried out by the angle detection section of the information terminal device shown in FIG. 6.

FIG. 8(*a*) shows the allowable angle range as a table (opening angle allowable table). The table shows the smallest angle and the largest angle of the allowable angle range, and is stored in a storage section (not shown) provided in the information terminal device. Further, the values of the table may be modified according to user's preference within the allowable angle range. FIG. 8(*b*) shows an example of modification of the table according to user's preference.

Here, with reference to a flow chart of FIG. 8(*c*), the following explains a procedure of taking a three-dimensional image by using the table, in the information processing device of the present embodiment.

Firstly, when the user selects a mode for taking a three-dimensional images in the information terminal device, the angle detection section 11 detects the angle 2r (angle information) of inclination of the covering body 9 with respect to the main body 8 (S1). Next, the angle detection section 11 judges whether or not the detected angle is at or greater than the smallest angle of the table (S2). Here, when the angle is at or greater than the smallest angle of the table (YES in S2), the angle detection section 11 then judges whether or not the detected angle is at or smaller than the largest angle of the table (S3). When the angle is at or smaller than the largest angle of the table (YES in S3), it is judged that the angle 2r of inclination of the covering body 9 with respect to the main body 8 is within a suitable range for taking a three-dimensional image. Here, when the result of S3 is YES, shooting operation judgment step is performed by a CPU (not shown; S4). This shooting operation judgment step is to judge weather or not the shooting operation is completed. If the user has completed the shooting operation, the sequence of procedure is finished (YES in S4).

On the other hand, when the user has not completed the shooting operation, the sequence of procedure goes to S1 by the CPU (not shown) so as to detect, if any, modification of the angle of inclination of the covering body 9 with respect to the main body 8 by the user (No in S4). Then, the angle detection section 11 again detects the angle 2r of inclination of the covering body 9 with respect to the main body 8, and then the sequence again goes through S2 to S4.

Further, in S2, when the angle detection section 11 judges that the detected angle 2r is smaller than the smallest angle of the table (No in S2), or judges that the angle 2r is greater than the largest angle of the table (No in S3), the sequence of procedure goes to S5. In S5, the angle detection section 11 transmits information to the image information processing section 4 so as to indicate that the angle 2r of inclination is not suitable for taking a three-dimensional image. The image information processing section 4 transmits this information to the image display section 5. Further, the image display section 5 displays the information to the user. After displaying the information, the sequence goes to S1 by the CPU (not shown) so that the angle detection section 11 detects the angle 2r after modification by the user. Then, the sequence again goes through S1 to S5.

As described, as a method of informing the user that the angle of inclination is not suitable for taking a three-dimensional image, the present embodiment has described a procedure in which the image display section (information providing section) 5 displays a message indicating that the angle of inclination is not suitable for taking a three-dimensional image. However, the method of providing the information is not limited to this procedure. For example, the message may be warning sound given by a speaker (information providing section; not shown). Further, the information terminal device may be provided with a function for disabling the information terminal device from taking an image when the angle of inclination is not suitable for taking a three-dimensional image.

As described, according to the arrangement of the present embodiment, the angle detection section 11 detects the angle of inclination. Then, when the angle detection section 11 judges that the angle is not within a predetermined allowable angle range, it outputs information indicating that the angle of inclination is not suitable for taking a three-dimensional image. Further, the image display section 5 displays this information as warning to the user before the user takes a three-dimensional image.

Note that, as an example of the angle detection section 11, a variable resistor may be used. In this case, the variable resistor is provided inside the movable connection section 6. Further, the main body of the variable resistor is held by the movable connection section 6 of the main body 8, and the axis of the variable resistor is held by the movable connection section 6 of the covering body 9. With such a structure, the main body of the variable resistor moves together with the movable connection section 6 of the main body 8, and the axis of the variable resistor moves together with the movable connection section 6 of the covering body 9. Accordingly, it is possible to obtain a resistor value corresponding to the angle of inclination of the covering body 9 with respect to the main body 8. Further, the angle of inclination of the covering body 9 with respect to the main body 8 may be figured out based on the resistor value. Note that, the angle detection section 11 may have any arrangements as long as it is capable of detecting the angle of inclination of the covering body 9 with respect to the main body 8; thus, the angle detection section 11 is not limited to the form of the variable resistor.

Fifth Embodiment

Figure 9:
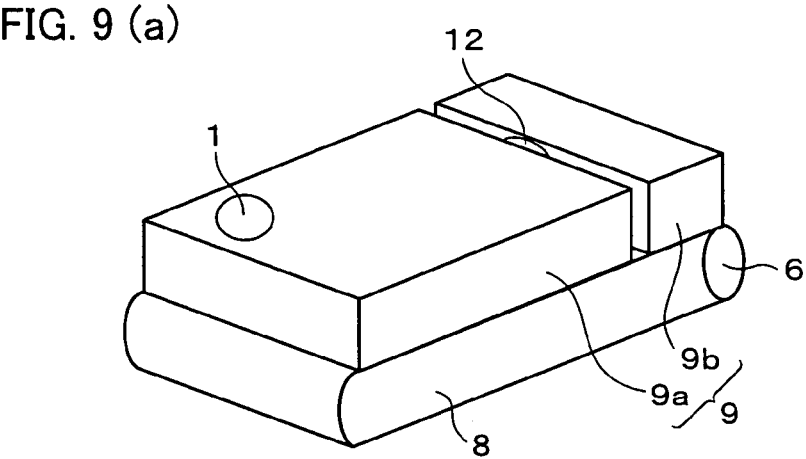
FIG. 9(a) is a perspective view illustrating the outer shape in a closed state of an information terminal device according to still another embodiment of the present invention, including a covering body rotation axis.
FIG. 9(b) is a side view illustrating the outer shape in an opened state of the information terminal device of FIG. 9(a).
FIG. 9(c) is a perspective view illustrating an opened state of the information terminal device of FIG. 9(a) with the covering body movable section inverted.
Figure 9:
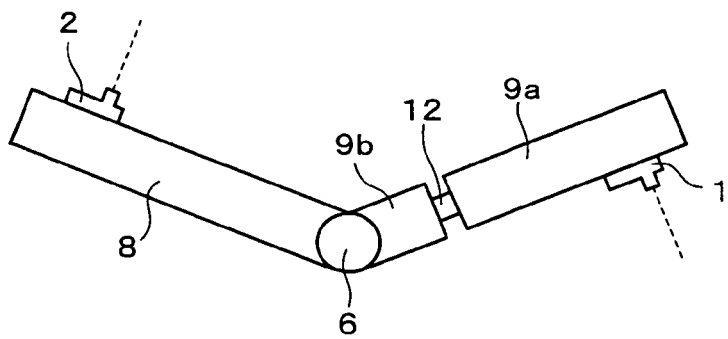
Figure 9:
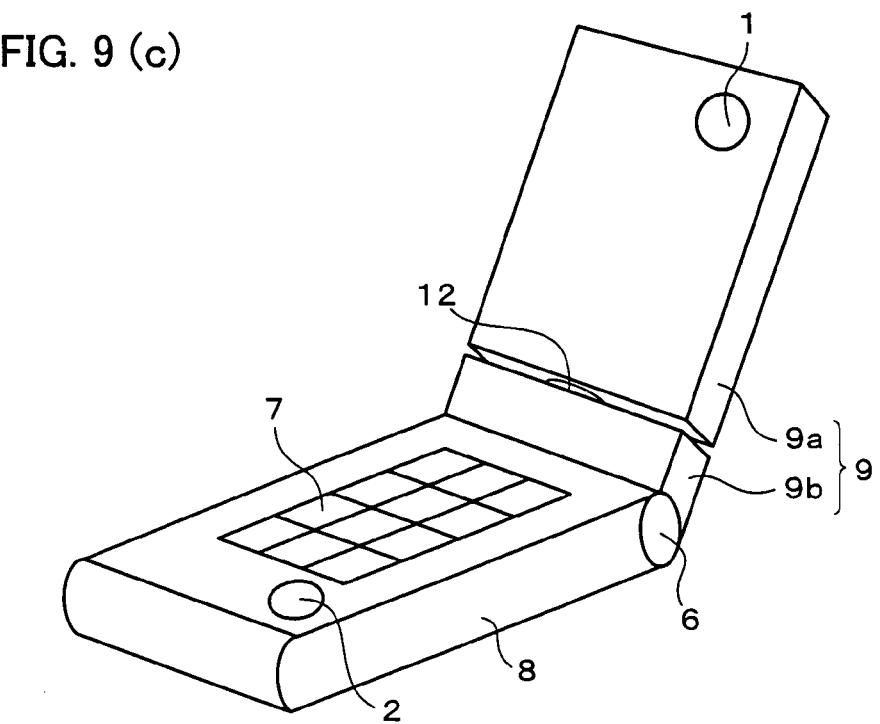

Still another embodiment of the present invention will be described below with reference to figures. FIGS. 9(a) through 9(c) are drawings illustrating the outer shape of an information terminal device according to the present embodiment. FIG. 9(a) is a perspective view illustrating the information terminal device in a closed state in which the free end of the main body 8 and the free end of the font body 9 are in contact with each other.

The information terminal device of the present embodiment includes the image pickup section 1 on a different portion from that of the FIG. 2(a) and FIG. 3. As shown in FIG. 9(a), in the information terminal device of the present embodiment, the covering body 9 is made up of a covering body movable section (movable section) 9a and a covering body fixed section (fixed section) 9b. The covering body 9 includes the image pickup section 1 on the rear surface of the covering body movable section 9a.

FIG. 9(b) shows an opened state of the information terminal device in which the free end of the main body 8 and the free end of the font body 9 are removed from each other. By thus opening the information terminal device and bringing the surface of the main body 8 and the surface of the covering body 9 to be opposite to the user, the shooting direction of the image pickup section 1 faces toward a direction identical to the sight line of the user. Thus, the information terminal device is in a form allowing the user to easily take sceneries or the like, with the image pickup section 1. On the other hand, the image pickup section 2 is opposite to the user in this state. In this view, the information terminal device is in a form allowing the user to take a self-portrait of the user. However, it should be noted that, in the state of FIG. 9(b), the shooting directions of the respective image pickup sections 1 and 2 do not intersect with each other, thus disabling the information terminal device to take a three-dimensional image.

Therefore, the information terminal device of the present embodiment includes a covering body rotation axis (angle adjustment mechanism) 12 on the covering body 9. The covering body rotation axis 12 is provided between the covering body movable section 9a and the covering body fixed section 9b, and placed along the length direction of the covering body 9. The covering body rotation axis 12 is held by the covering body movable section 9a, and also is rotatably held by the covering body fixed section 9b. Note that, the covering body rotation axis 12 may be held by the covering body fixed section 9b, and may be rotatably held by the covering body movable section 9a.

Further, as shown in FIG. 9(c), the covering body movable section 9a can be inverted when taking a three-dimensional image. More specifically, by inverting the covering body movable section 9a, the information terminal device may be folded with the rear surface (one plane) of the covering body 9 and the front surface of the main body 8 opposed to each other. With this state, it is possible to intersect the shooting direction of the image pickup section 1 and the shooting direction of the image pickup section 2, thus enabling the information terminal device to take a three-dimensional image.

Since the information terminal device according to the present embodiment includes the image pickup section 2 on the front surface of the main body 8, and the image pickup section 1 on the rear surface of the covering body movable section 9a, it allows the user to easily take both sceneries and a self-portrait of the user. Further, this structure includes the covering body rotation axis 12, which allows inversion of the front surface and the rear surface of the covering body movable section 9a. More specifically, the information terminal device may be folded with the rear surface of the covering body 9 (one plane) and the front surface of the main body 8 opposed to each other. With this state, it is possible to intersect the shooting direction of the image pickup section 1 and the shooting direction of the image pickup section 2. Accordingly, the foregoing structure is also suitable for taking a three-dimensional image. Further, the structure also clears away the limitation of mounting plural image pickup sections to a small device.

As described, the covering body 9 includes the covering body movable section 9a including the image pickup section 1 and the covering body fixed section 9b separated from the covering body movable section 9a. The covering body 9 further includes the covering body rotation axis 12 so as to allow changes of shooting direction of the image pickup section 1 by moving the covering body movable section 9a. Therefore, by moving the covering body movable section 9a, while leaving the covering body fixed section 9b fixed to the covering body 9, it is possible to change shooting direction of the image pickup section 1.

Here, by placing the information terminal device between the user and the object of shooting, it is possible to place the shooting direction of the image pickup section 2 toward the user, and place the shooting direction of the image pickup section 1 toward the object of shooting. This allows the user to simultaneously film both a two-dimensional image of a self-portrait of the user and a two-dimensional image of the object, while also enabling the information terminal device to take a three-dimensional image.

Particularly, when the covering body movable section 9a is rotated, the shooting direction of the image pickup section 1 draws a circular track about the length of the covering body 9, so that the shooting direction of the image pickup section 1 and the shooting direction of the image pickup section 2 provided on the other plane are moved to face opposite directions. On this account, by placing the information terminal device between the user and the object of shooting, it is possible to place the shooting direction of the image pickup section 2 toward the user, and place the shooting direction of the image pickup section 1 toward the object of shooting.

Figure 10:
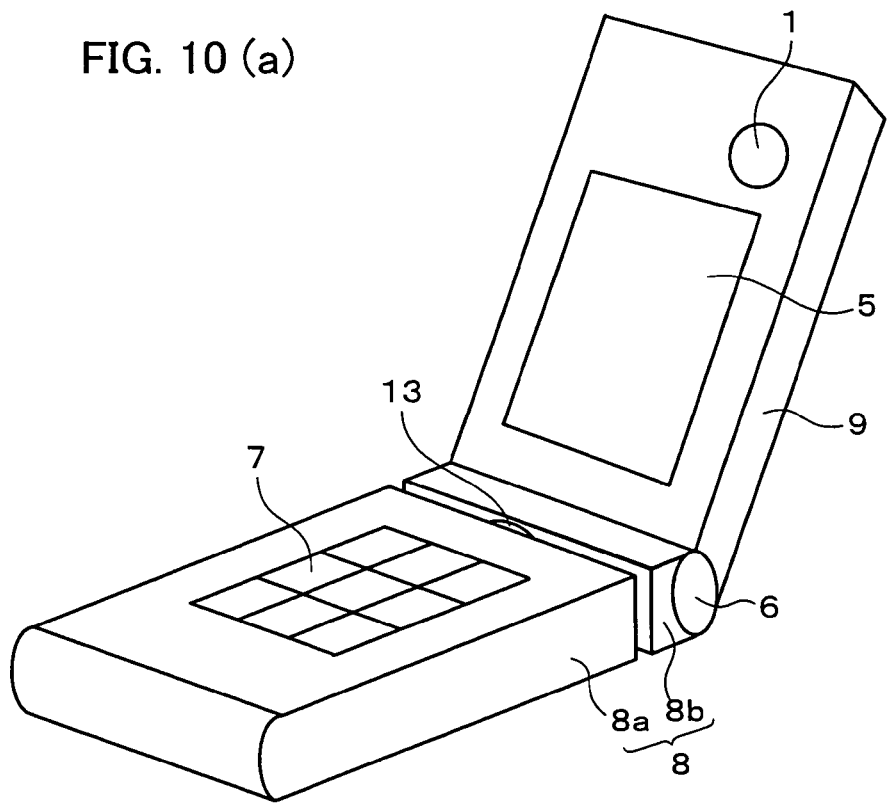
FIG. 10(a) is a perspective view illustrating the outer shape in an opened state of an information terminal device according to yet another embodiment of the present invention, including a main body rotation axis.
FIG. 10(b) is a perspective view illustrating the information terminal device of FIG. 10(a) with the main body movable section inverted.
Figure 10:
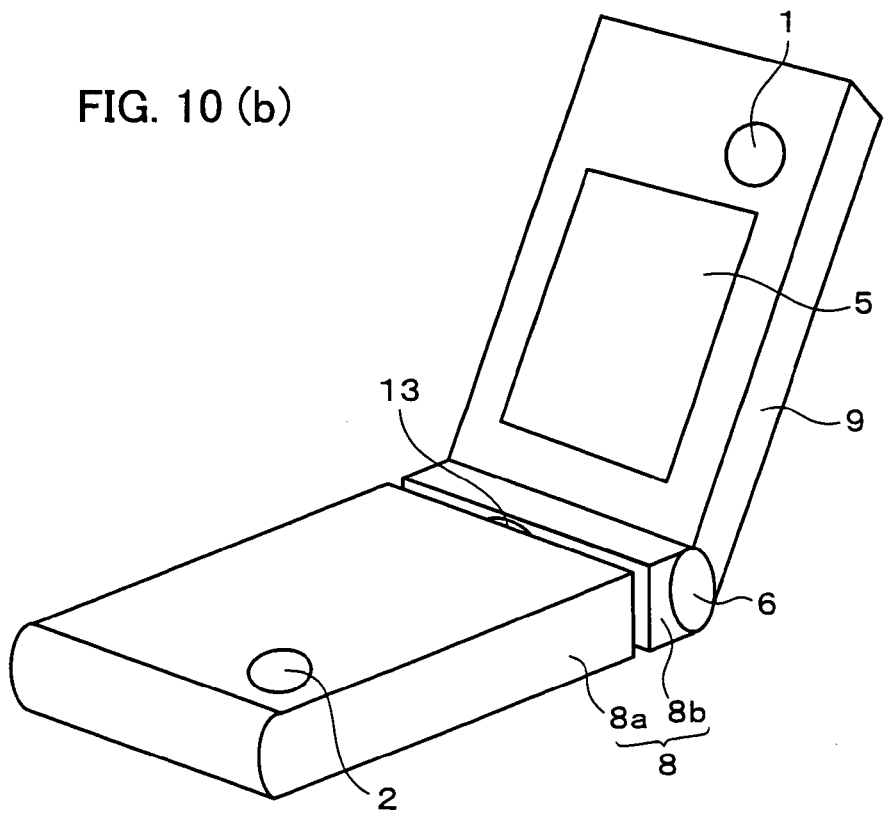

Note that, the covering body rotation axis 12 provided on the covering body 9 may instead be a main body rotation axis (angle adjustment mechanism) 13 provided on the main body, which is broken into a main body movable section (movable section) 8a and a main body fixed section (fixed section) 8b, as shown in FIG. 10(a). This structure also ensures the same effect as that of the structure in which the covering body 9 includes the covering body rotation axis 12. In this case, the image pickup section 2 is provided on the rear surface of the main body movable section 8a (one plane), as shown in FIG. 10(b). Note that, FIG. 10(a) is a perspective view illustrating the outer shape of an information terminal device including the main body rotation axis 13. FIG. 10(b) is a perspective view illustrating the information terminal device of FIG. 10(a) with the main body movable section 13 inverted.

Figure 11:
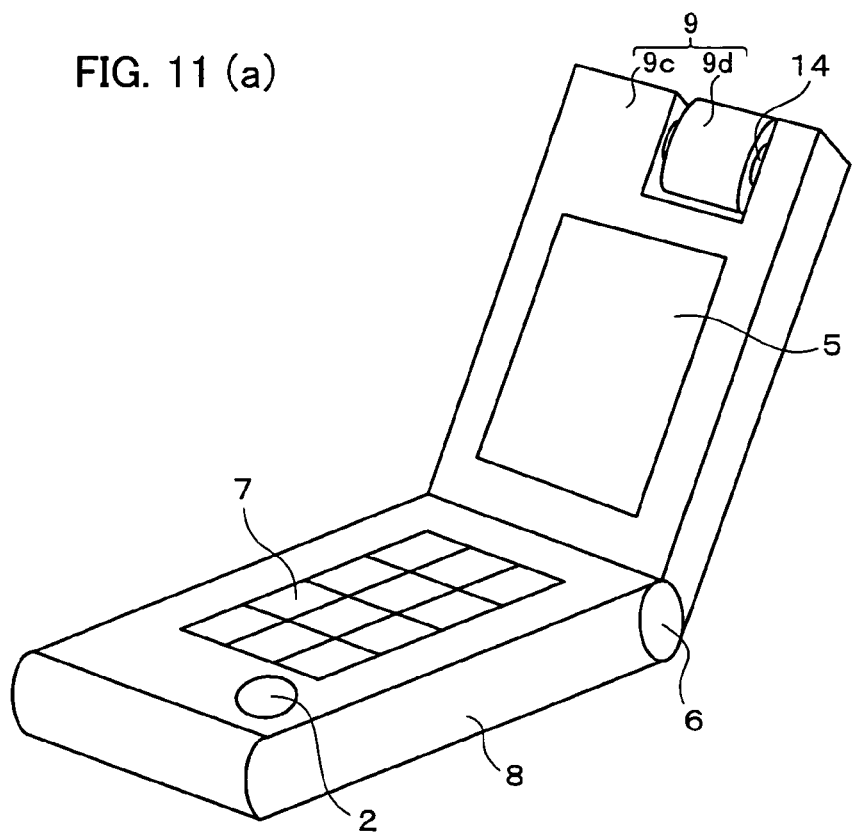
FIG. 11(a) is a perspective view illustrating the outer shape of an information terminal device according to still another embodiment of the present invention, including an image pickup section rotator.
FIG. 11(b) is a perspective view illustrating the information terminal device of FIG. 11(a) with the image pickup section rotator inverted.
Figure 11:
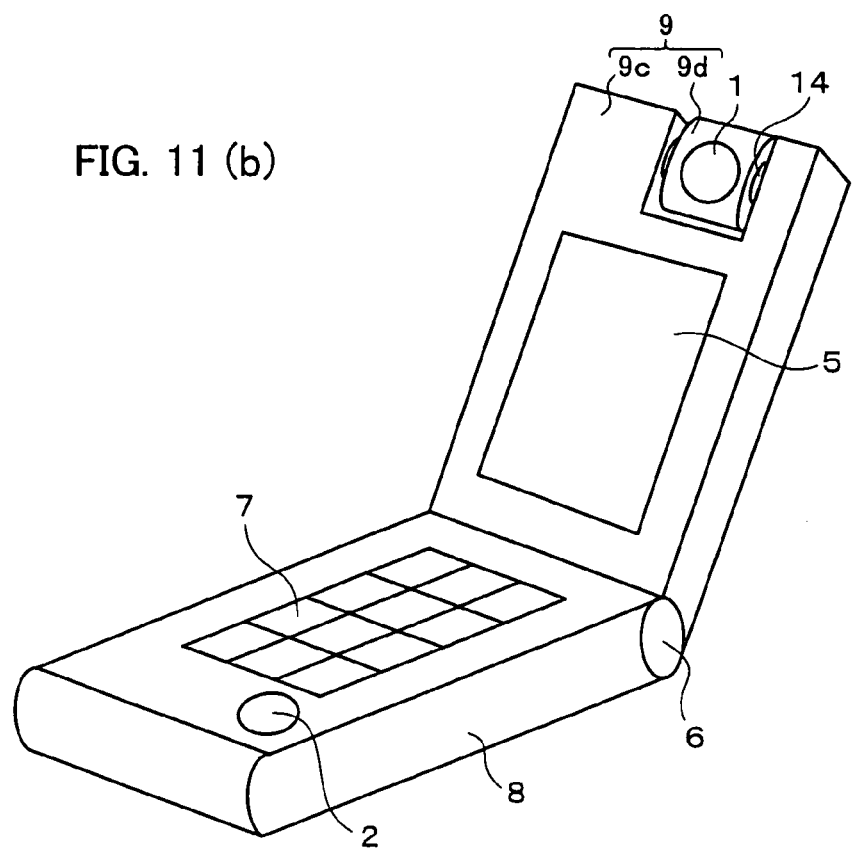

Further, as shown in FIG. 11(b), the image pickup section 1 may be provided on the image pickup section rotator (movable section) 9d. The image pickup section rotator 9d is separated from the covering body fixed section (fixed section) 9c, and is rotatably held by an image pickup rotation axis (angle adjustment mechanism) 14. Further, the image pickup section rotation axis 14 is held by the covering body fixed section 9c along the width direction of the covering body fixed section 9c. This structure also ensures the same effect as that of the structure in which the covering body 9 includes the covering body rotation axis 12. The information terminal device of FIG. 11(a) changes its state into that shown in FIG. 11(b) when taking a three-dimensional image.

Note that, instead of the foregoing structure, the image pickup section rotator 9d may be held by the image pickup section rotation axis 14, and may be rotatably held by the covering body fixed section 9c.

Further, the angle adjustment mechanism may have any arrangements apart from the covering body rotation axis 12, the main body rotation axis 13 or the image pickup section rotation axis 14, as long as it is capable of adjusting the shooting direction of the image pickup section 1 or 2.

Sixth Embodiment

Figure 15:
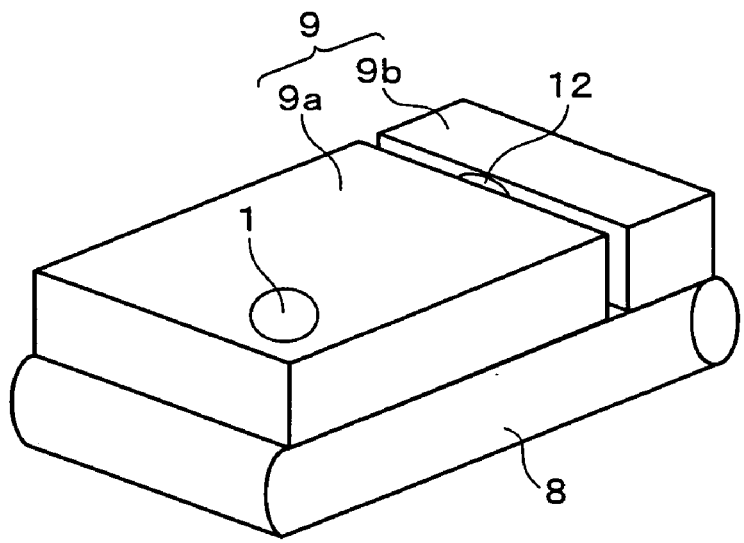
FIG. 15(a) is a perspective view illustrating the outer shape in a closed state of an information terminal device according to yet another embodiment of the present invention, including a covering body rotation axis, and image pickup sections, which are asymmetrically placed with respect to the border of the covering body and the main body.
FIG. 15(b) is a side view illustrating the outer shape in an opened state of the information terminal device of FIG. 15(a).
Figure 15:
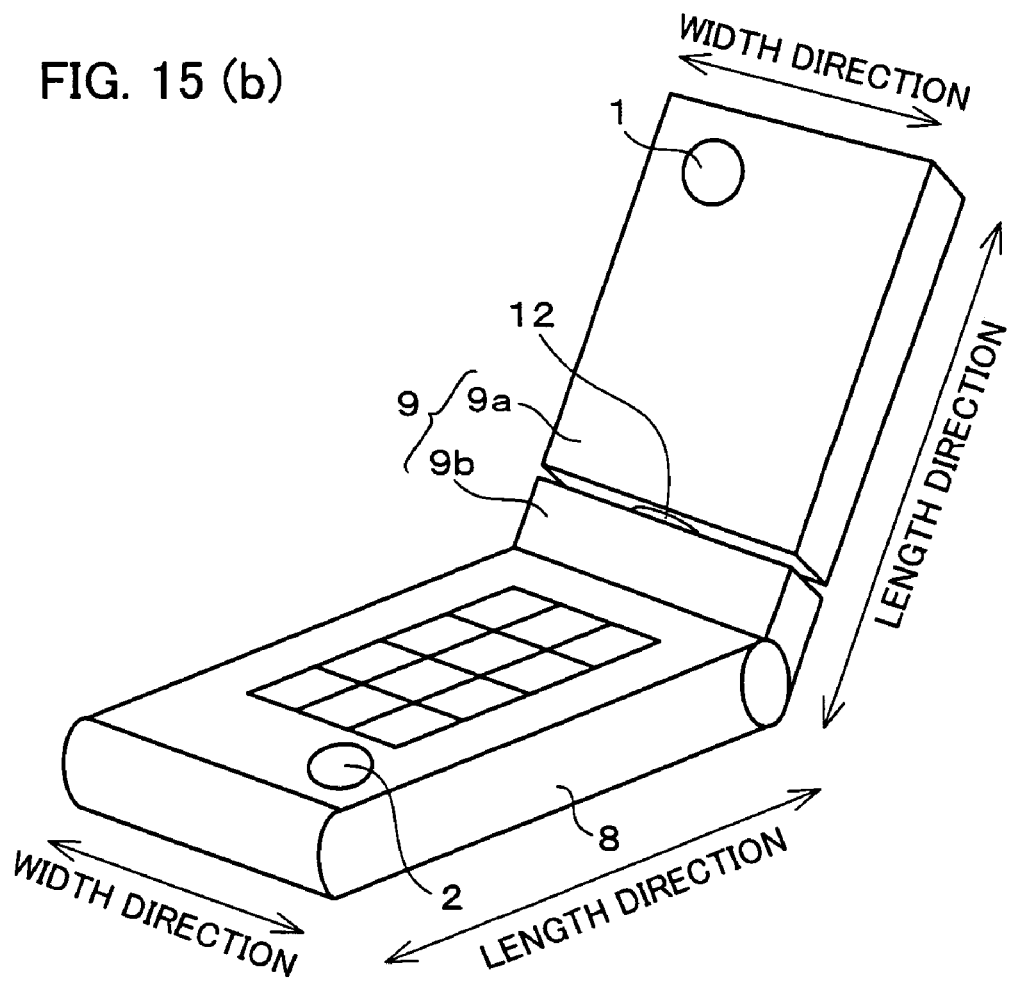

Still another embodiment of the present invention will be described below with reference to figures. FIG. 15(a) is a perspective view illustrating the outer shape in a closed state of an information terminal device according to the present embodiment in which a free end of the main body 8 and a free end of the covering body 9 are in contact with each other.

The information terminal device according to the present embodiment has the same arrangement as that shown in FIGS. 9(a) through 9(c) except that the position of the image pickup section 1.

In the information terminal device shown in FIG. 2(a), the image pickup section 1 and the image pickup section 2 are symmetrically placed with respect to the border of the covering body 9 and the main body 8. Further, in the information terminal device shown in FIGS. 9(a) through 9(c), the image pickup section 1 and the image pickup section 2 are symmetrically placed with respect to the border of the covering body 9 and the main body 8 when the covering body movable section 9a is inverted so that the rear surface of the covering body 9 and the front surface of the main body 8 opposed to each other.

On the other hand, as shown in FIG. 15(b), the information terminal device according to the present embodiment, the image pickup section 1 and the image pickup section 2 are asymmetrically placed with respect to the border of the covering body 9 and the main body 8, when the covering body movable section 9a is inverted so that the rear surface of the covering body 9 and the front surface of the main body 8 opposed to each other.

Figure 16:
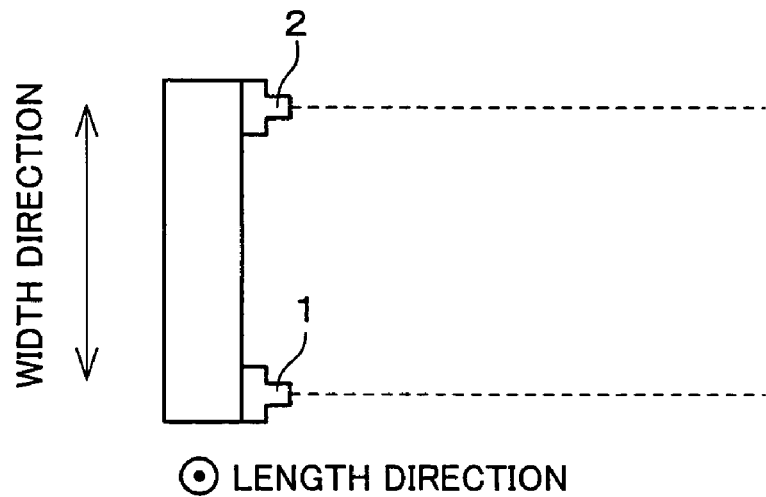
FIG. 16(a) is an explanatory view illustrating the same information terminal device shown in FIGS. 15(a) and 15(b) in which the shooting direction of one image pickup section and the shooting direction of the other image pickup section do not intersect with each other.
FIG. 16(b) is an explanatory view illustrating the information terminal device shown in FIGS. 15(a) and 15(b) in which the shooting direction of one of the image pickup sections is adjusted so that the shooting direction of one image pickup section and the shooting direction of the other image pickup section intersect with each other.
Figure 16:
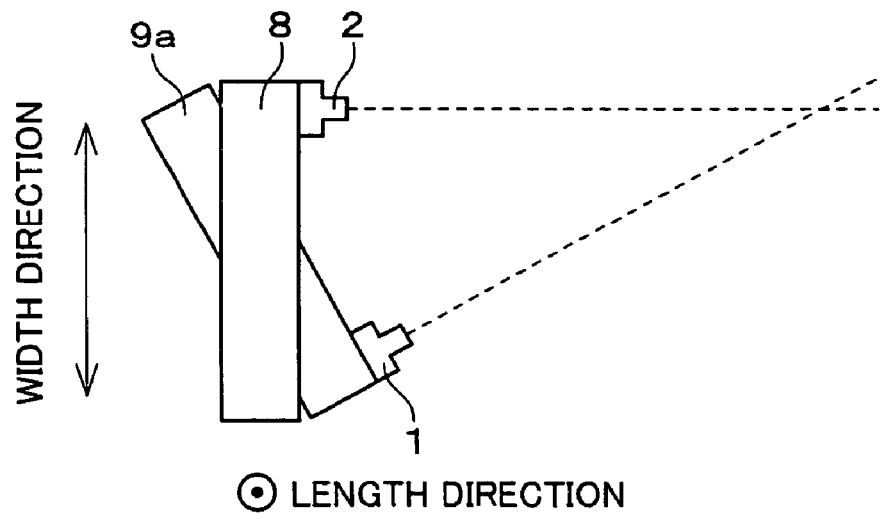

FIG. 16(a) is an explanatory view illustrating the same information terminal device shown in FIGS. 15(a) and 15(b) in which the shooting direction of one image pickup section and the shooting direction of the other image pickup section do not intersect with each other.

As shown in FIG. 16(a), when the image pickup section 1 and the image pickup section 2 are asymmetrically placed with respect to the border of the covering body 9 and the main body 8, the shooting direction of image pickup section 1 and the shooting direction of the image pickup section 2 are in parallel to each other with a certain distance in the width direction of the information terminal device. Thus, the shooting direction of the image pickup section 1 and the shooting direction of the image pickup section 2 do not intersect with each other.

As described, the information terminal device of the present embodiment includes the covering body rotation axis 12 on the covering body 9. The covering body rotation axis 12 is provided between the covering body movable section 9a and the covering body fixed section 9b, and placed along the length direction of the covering body 9. The covering body rotation axis 12 is held by the covering body movable section 9a, and is rotatably held by the covering body fixed section 9b.

With this structure, the covering body movable section 9a can be rotated, and the shooting direction of the image pickup section 1 draws a circular track about the length of the covering body 9, so that the shooting direction of the image pickup section 1 may be moved to be perpendicular to the length of the covering body 9, as shown in FIG. 16(b). On this account, it is possible to easily intersect the shooting direction of the image pickup section 1 and the shooting direction of the image pickup section 2 even with the structure in which the image pickup section 1 and the image pickup section 2 are asymmetrically placed with respect to the border of the covering body 9 and the main body 8.

Such a structure of the present embodiment is particularly effective for an information terminal device with a relatively long width.

Seventh Embodiment

Figure 12:
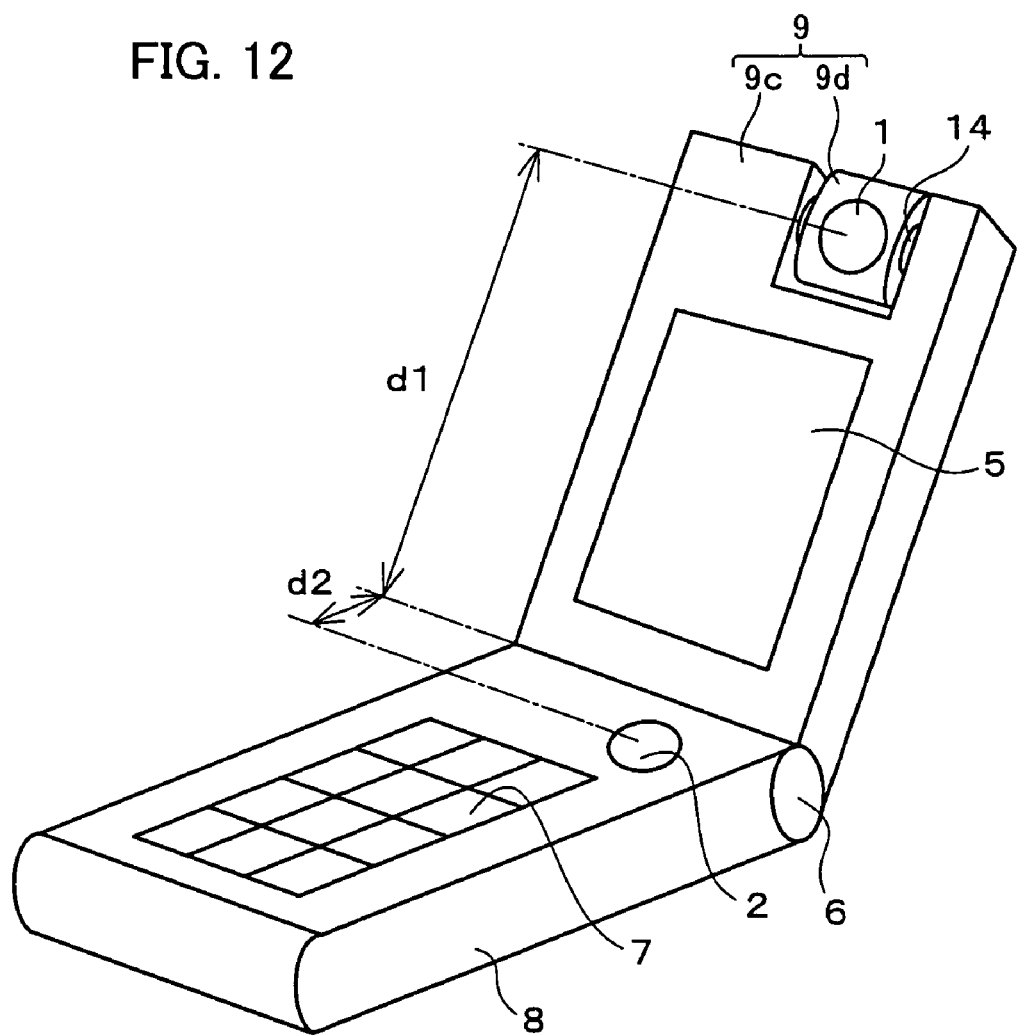
FIG. 12 is a perspective view illustrating an information terminal device including an image pickup section rotator, and image pickup sections having different distances between themselves and the movable connection section.

Yet another embodiment of the present invention will be described below with reference to figures. FIG. 12 is a perspective view illustrating the outer shape of an information terminal device according to the present embodiment, and FIG. 13(a) and FIG. 13(b) are side views of the information terminal device of the present embodiment.

Figure 13:
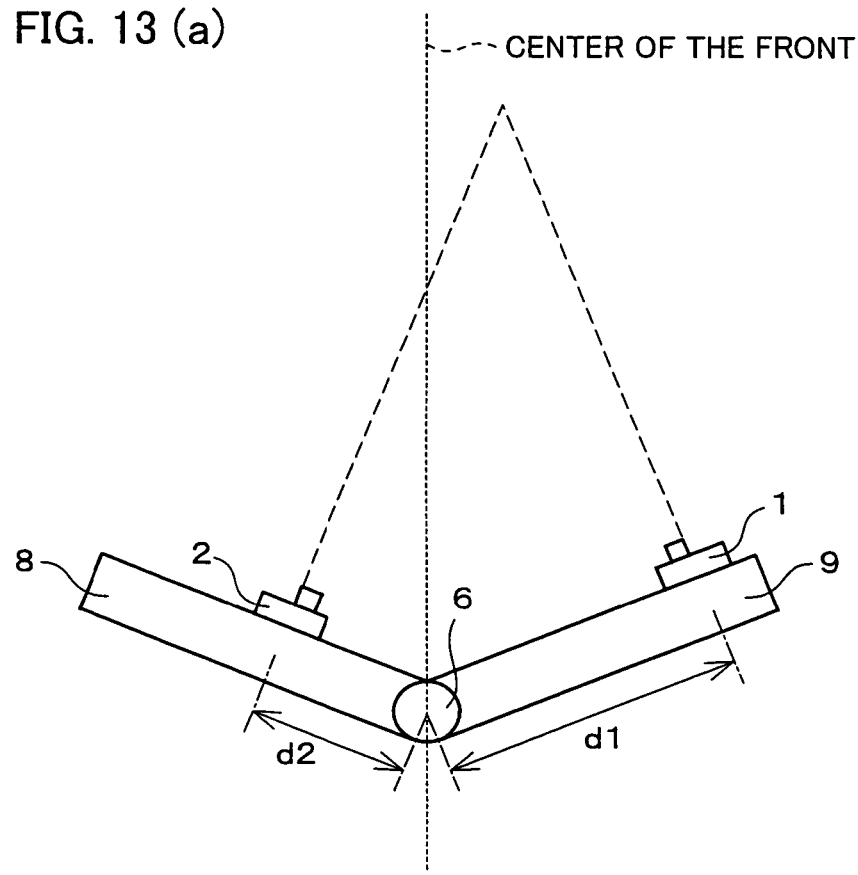
FIG. 13(a) is a side view illustrating the outer shape of the information terminal device of FIG. 12.
FIG. 13(b) is a side view of the information terminal device of FIG. 13(a) in a state where inclination of the image pickup section rotator is slightly changed.
Figure 13:
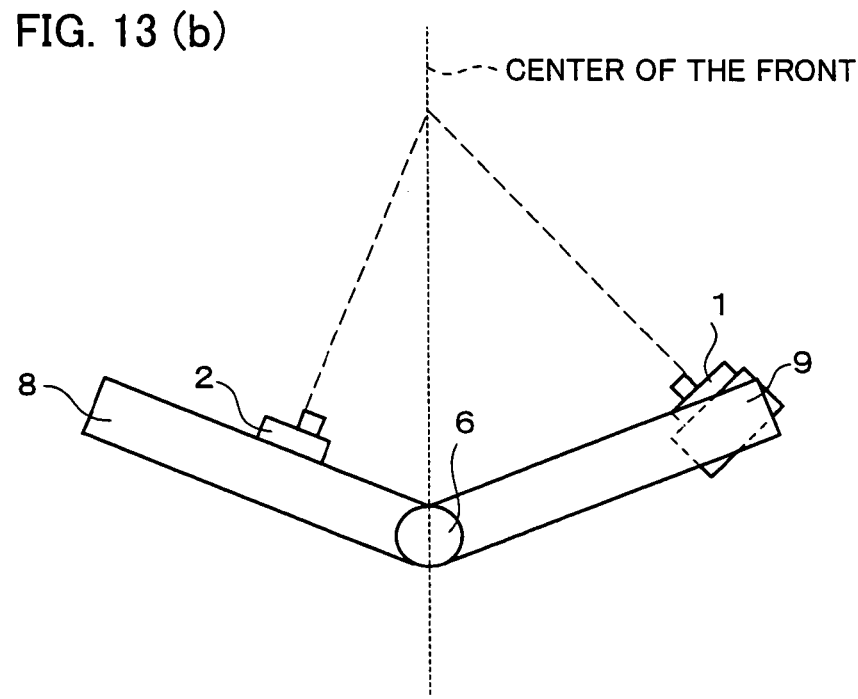

As shown in FIG. 13(a), the information terminal device according to the present embodiment is arranged so that the image pickup sections 1 and 2 having different distances d1 and d2, respectively, between themselves and the movable connection section 6. When the information terminal device has an arrangement of FIG. 13(a) due to mounting restriction, the intersection of the shooting direction of the image pickup section 1 and the shooting direction of the image pickup section 2 cannot be placed on the center of the front side of the information terminal device and the user, thus disabling the user to intuitively shoot the object.

In this view, the information terminal device of the present embodiment includes an angle adjustment mechanism for adjusting either the shooting direction of the image pickup section 1 or the shooting direction of the image pickup section 2. With this structure, as shown in FIG. 13(b), the user can adjust the shooting direction of the image pickup section 1 when taking a three-dimensional image, so as to set the intersection of the shooting direction of the image pickup section 1 and the shooting direction of the image pickup section 2 to be placed on the center of the front side of the information terminal device and the user, thus enabling the user to easily take a three-dimensional image.

Note that, as long as the image pickup section 1 is provided on the image pickup section rotator (movable section) 9d as shown in FIG. 12, the same structure as that shown in FIGS. 11(a) and 11(b) may also be adopted. The image pickup rotator 9d is separated from the covering body fixed section (fixed section) 9c, and is rotatably held by the image pickup section rotation axis (angle adjustment mechanism) 14. Further, the image pickup rotation section 14 is held by the covering body fixed section 9c along the width direction of the covering body fixed section 9c. This structure allows the user to adjust the shooting direction.

Here, the following will describe advantages of the foregoing function of changing the shooting direction of the image pickup section 1 by rotating the image pickup section rotator 9d. That is, by inverting the image pickup section rotator 9d so that the front surface of the covering body 9 and the front surface of the main body 8 face toward the user, the user can easily take a picture of sceneries etc. with the image pickup section 1 facing toward the direction identical to his/her sight line; and also the user can easily take a self-portrait with the image pickup section 2 facing toward him/her. Further, this arrangement also allows the user to set the shooting direction of the image pickup section 1 and the shooting direction of the image pickup section 2 to intersect with each other when taking a three-dimensional image. Moreover, the user can set the intersection of the shooting direction of the image pickup section 1 and the shooting direction of the image pickup section 2 to be opposite to the surface of the information terminal device, while also being the center of the front side of the information terminal device.

As described, the foregoing structure includes the image pickup section rotation axis 14 for adjusting the shooting direction of the image pickup section 1. This allows the user to adjust the shooting direction of the image pickup section 1 so that the intersection of the shooting direction of the image pickup section 1 and the shooting direction of the image pickup section 2 are opposite to the movable connection section 6 upon taking a three-dimensional image. Therefore, the user can intuitively film an object in the center of the front side of the information terminal device and the user.

Further, the foregoing structure allows the user to adjust the shooting direction of the image pickup section 1. Thus, with the information terminal device disposed between the user and the object, the user can set the shooting direction of the image pickup section 2 to face toward him/her and also can set the shooting direction of the image pickup section 1 to face the object. This allows the user to take a self-portrait and shooting of an object opposed to him/her at the same time, while also enabling the information terminal device to take a three-dimensional image.

Particularly, in the foregoing structure, the image pickup section rotator 9d is rotated about an axis extending in the width direction of the information terminal device. Thus, with the rotation of the image pickup section rotator 9d, the shooting direction of the image pickup section 1 draws a circular track about the width of the covering body 9, so that the shooting direction of the image pickup section 1 is moved to a direction perpendicular to the width direction. In this manner, it is possible to easily intersect the shooting direction of the image pickup section 1 and the shooting direction of the image pickup section 2.

Further, with the rotation of the image pickup section rotator 9d, the shooting direction of the image pickup section 1 draws a circular track about the width of the covering body 9, so that the shooting direction of the image pickup section 1 and the shooting direction of the image pickup section 2 are substantially opposite to each other. Thus, with the information terminal device disposed between the user and the object, the user can set the shooting direction of the image pickup section 2 to face toward him/her and also can set the shooting direction of the image pickup section 1 to face the object.

Further, the angle adjustment mechanism may have any arrangements apart from the image pickup section rotation axis 14, as long as it is capable of adjusting the shooting direction of the image pickup section 1 or 2.

The present invention is not limited to the described examples, and may be varied in many ways within the scope of claims. Namely, embodiments using an appropriate combination of the technical means disclosed in the various examples above are also included in the technical range of the present invention.

The present invention allows an arbitrary combination of the respective arrangements according to the present invention and the respective arrangements of the prior art. In order to solve the foregoing problems, a folding information terminal device according to the present invention, which is capable of taking a three-dimensional image and including two planes which become opposite to each other when the folding information terminal device is folded, includes at least one image pickup section on one plane of the two planes; and at least one image pickup section on the other plane.

With the foregoing arrangement, the folding information terminal device, which has two planes, includes a plurality of image pickup sections, as at least one image pickup section is provided on one plane, and at least one image pickup section is provided on the other plane. Therefore, the information terminal device is capable of simultaneously taking the same object with a plurality of image pickup sections at different positions. More specifically, a plurality pieces of image data with parallax regarding the same object can be captured to the information terminal device, thus enabling the information terminal device to take a three-dimensional image.

Further, the information terminal device includes at least one image pickup section on one plane of the two planes and at least one image pickup section on the other plane of the two planes, which become opposite to each other when the folding information terminal device is folded. With such a structure, the interval between the respective image pickup sections can be extended, compared to the conventional structure in which the image pickup sections are provided only on the display section (only on one plane), thus capturing a plurality pieces of image data with larger parallax than that of a conventional information terminal device. On this account, it is possible to capture a superior three-dimensional image than that captured by a conventional device.

In addition to the foregoing structure, the folding information terminal device according to the present invention is arranged so that the image pickup section is provided on a free end of the one plane and a free end of the other plane.

With the foregoing structure, the plural image pickup sections are respectively provided on the free end of the one plane and on the free end of the other plane. With this structure, the interval between the respective image pickup sections is substantially identical to the length of the information terminal device in the opened state. Therefore, it is possible to maximally ensure the interval between the respective image pickup sections, in the folding information terminal device.

In addition to the foregoing structure, the folding information terminal device according to the present invention further includes a movable connection section for connecting a fixed end of the one plane and a fixed end of the other plane.

With the foregoing structure, the information terminal device includes the movable connection section for connecting the fixed end of the one plane and the fixed end of the other plane. This structure enables the information terminal device to arbitrary control the inclination of the one plane with respect to the other plane. Further, it is possible to arbitrary control the interval between the respective image pickup sections on both planes, as well as the respective shooting directions from those image pickup sections. Therefore, the parallax of the images captured by the image pickup sections can be adjusted, thus changing vision of the user so that the user sees different kinds of three-dimensional image.

Note that, this structure may be combined with any of the described structures.

In addition to the foregoing structure, the folding information terminal device according to the present invention is arranged so that a distance between the image pickup section on the one plane and the movable connection section is identical to a distance between the image pickup section on the other plane and the movable connection section.

With the foregoing structure, the information terminal device includes an image pickup sections on one plane and an image pickup section on the other plane, and the distances from the respective image pickup sections to the movable connection section are identical. With this structure, the user can set the intersection of the shooting directions of the respective image pickup sections to be opposite to the movable connection section. This allows the user to easily shoot an object in the center of the front side of the information terminal device and the user, thus enabling the user to more intuitively shoot the object.

Note that, this structure may be combined with any of the described structures.

In addition to the foregoing structure, the folding information terminal device according to the present invention further includes a movable range restriction section for restricting an angle of inclination of the one plane with respect to the other plane within a predetermined angle range.

With the foregoing structure, the movable range restriction section restricts the angle of inclination of the one plane with respect to the other plane within a predetermined range. With this structure, the angle of inclination can be restricted so as to ensure intersection of the shooting direction of the image pickup section on the one plane and the shooting direction of the image pickup section on the other plane. Therefore, since the shooting direction of the image pickup section on the one plane and the shooting direction of the image pickup section on the other plane securely intersect with each other, it is possible to prevent the information terminal device from failing to shoot a three-dimensional image.

Note that, this structure may be combined with any of the described structures.

In addition to the foregoing structure, the folding information terminal device according to the present invention further includes an angle detection section for detecting the angle of inclination of the one plane with respect to the other plane, and when the angle of inclination is not within a predetermined angle range, for outputting information indicating that the angle of inclination is not suitable for taking a three-dimensional image; and an information providing section for providing the information.

With the foregoing structure, the information terminal device includes the angle detection section for detecting information regarding the angle of inclination. Then, when the angle of inclination falls outside a predetermined allowable range, the angle detection section transmits information indicating that the angle of inclination is not suitable for taking a three-dimensional image. This information is further provided to the user via the image providing section, thus warning the user before the user takes a three-dimensional image.

Note that, this structure may be combined with any of the described structures.

In addition to the foregoing structure, the folding information terminal device according to the present invention further includes an angle adjustment mechanism for adjusting a shooting direction of the image pickup section on the one plane.

When the distances from the respective image pickup sections and the movable connection section are not even due to mounting limit of the information terminal device, the user may not be able to set the intersection of the shooting direction of the image pickup section on the one plane and the shooting direction of the image pickup of the other plane to be opposite to the movable connection section.

The foregoing structure includes the angle detection section for adjusting the shooting direction of the image pickup section on the one plane. This allows the user to set the intersection of the shooting direction of the image pickup section on the one plane and the shooting direction of the image pickup of the other plane to be opposite to the movable connection section. In this manner, the user can more easily shoot the object placed in the center of the front side of the information terminal device and the user, thus enabling the user to more intuitively shoot the object.

Further, with the foregoing structure allowing the user to adjust the shooting direction of the image pickup section on the one plane, it is possible to place the shooting direction of the image pickup section on the other plane toward the user, and place the shooting direction of the image pickup section on the one plane toward the object, by placing the information terminal device between the user and the object. This allows the user to simultaneously film both a two-dimensional image of a self-portrait of the user and a two-dimensional image of the object, while also enabling the information terminal device to take a three-dimensional image.

Note that, this structure may be combined with any of the described structures.

In addition to the foregoing structure, the folding information terminal device according to the present invention is arranged so that the one plane is provided on either a main body or a covering body made up of (a) a movable section including the image pickup section, and (b) a fixed section separated from the movable section, and the angle adjustment mechanism moves the movable section from the fixed section so as to change shooting direction of the image pickup section.

With the foregoing structure, the main body or the covering body including the one plane is made up of a movable section having the image pickup section and a fixed section separated from the movable section; and the angle adjustment mechanism moves the movable section from the fixed section so as to change shooting direction of the image pickup section. Therefore, by moving the movable section having the image pickup section, while fixing the main body or the covering body, it is possible to change shooting direction of the image pickup section.

Note that, this structure may be combined with any of the described structures.

In addition to the foregoing structure, the folding information terminal device according to the present invention is arranged so that the movable section is rotated about an axis extending in the width direction of the one plane.

With the foregoing structure, the movable section is rotated about an axis extending in the width direction of the one plane. Thus, with the rotation of the movable section, the shooting direction of the image pickup section on the movable section draws a circular track about the width, so that the shooting direction of the image pickup section is moved to a direction perpendicular to the width direction. In this manner, it is possible to easily intersect the shooting direction of the respective image pickup sections.

Further, when the movable section is rotated, the shooting direction of the image pickup section on the movable section draws a circular track about the width, so that the shooting direction of the image pickup section on the one plane and the shooting direction of the image pickup section on the other plane are substantially opposite to each other. Thus, with the information terminal device disposed between the user and the object, the user can set the shooting direction of the image pickup section on the other plane to face toward him/her, and also can set the shooting direction of the image pickup section on the one plane to face the object. This allows the user to simultaneously film both a two-dimensional image of a self-portrait of the user and a two-dimensional image of the object, while also enabling the information terminal device to take a three-dimensional image.

Note that, this structure may be combined with any of the described structures.

Further, in addition to the foregoing structure, the folding information terminal device according to the present invention is arranged so that the image pickup section on the one plane and the image pickup section on the other plane are asymmetrically placed with respect to a border of the one plane and the other plane.

With the foregoing structure, even when the image pickup section on the one plane and the image pickup section on the other plane are asymmetrically placed with respect to a border of the one plane and the other plane, the shooting direction of the image pickup section can be moved to a direction perpendicular to the width direction. In this manner, it is possible to easily intersect the shooting direction of the respective image pickup sections.

Note that, this structure may be combined with any of the described structures.

Further, in addition to the foregoing structure, the folding information terminal device according to the present invention is arranged so that the movable section is rotated about an axis extending in the length direction of the one plane.

With the foregoing structure, the movable section is rotated about an axis extending in the length direction of the one plane, and therefore, when the movable section is rotated, the shooting direction of the image pickup section on the movable section draws a circular track about the length, so that the shooting direction of the image pickup section on the one plane and the shooting direction of the image pickup section on the other plane are substantially opposite to each other. Thus, with the information terminal device disposed between the user and the object, the user can set the shooting direction of the image pickup section on the other plane to face toward him/her, and also can set the shooting direction of the image pickup section on the one plane to face the object. This allows the user to simultaneously film both a two-dimensional image of a self-portrait of the user and a two-dimensional image of the object, while also enabling the information terminal device to take a three-dimensional image.

Further, with the foregoing structure, the movable section is rotated about an axis extending in the length direction of the one plane; and therefore, when the movable section is rotated, the shooting direction of the image pickup section on the movable section draws a circular track about the length, so that the shooting direction of the image pickup section can be moved to a direction perpendicular to the width direction. In this manner, it is possible to easily intersect the shooting direction of the respective image pickup sections.

Note that, this structure may be combined with any of the described structures.

Further, in addition to the foregoing structure, the folding information terminal device according to the present invention further includes a movable connection section for connecting a fixed end of the one plane and a fixed end of the other plane, and a distance between the image pickup section on the one plane and the movable connection section is different from a distance between the image pickup section on the other plane and the movable connection section.

With the foregoing structure, even when the image pickup section on the one plane and the image pickup section on the other plane are asymmetrically placed with respect to a border of the one plane and the other plane, the shooting direction of the image pickup section can be moved to a direction perpendicular to the length direction. In this manner, it is possible to easily intersect the shooting direction of the respective image pickup sections.

Note that, this structure may be combined with any of the described structures.

Further, the folding information terminal device according to the present invention is arranged so that the movable connection section includes a simple stopper mechanism for movably holding inclination of the one plane with respect to the other plane at an arbitrary stage of angle.

This structure enables the information terminal device to arbitrary control the interval between the respective image pickup sections, and the respective shooting directions of those image pickup sections. Therefore, it is possible to change vision of the user, so that the user sees different kinds of three-dimensional image.

Note that, this structure may be combined with any of the described structures.

Further, the folding information terminal device according to the present invention further includes an image information processing section for outputting plural pieces of image data having different color components, the plurality of pieces of image data being identical in number with said at least one image pickup section on one plane of the two planes and said at least one image pickup section on the other plane combined.

Note that, this structure may be combined with any of the described structures.

Further, the folding information terminal device according to the present invention further includes an image display section for displaying a plurality of images based on the plurality pieces of image data outputted by the image processing section.

Note that, this structure may be combined with any of the described structures.

Further, in addition to the foregoing structure, the folding information terminal device according to the present invention is arranged so that the image providing section is made of a three-dimensional liquid crystal.

Note that, this structure may be combined with any of the described structures.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A folding information terminal device including two planes which become opposite to each other when the folding information terminal device is folded, comprising:
   at least one image pickup section on one plane of the two planes;
   at least one image pickup section on the other plane;
   a movable connection section for connecting a fixed end of the one plane and a fixed end of the other plane; and
   a movable range restriction section for preventing inclination of the one plane with respect to the other plane from exceeding a predetermined angle,
   wherein
   the predetermined angle falls in a range with which a shooting direction of the one plane and a shooting direction of the other plane securely intersect with each other within an allowable shooting distance for the image pickup section of the one plane and the image pickup section of the other plane.

2. The folding information tenninal device as set forth in claim 1, wherein:
   the image pickup section is provided on a free end of the one plane and a free end of the other plane.

3. The folding information terminal device as set forth in claim 1, wherein:
   a distance between the image pickup section on the one plane and the movable connection section is identical to a distance between the image pickup section on the other plane and the movable connection section.

4. The folding infonnation terminal device as set forth in claim 1, further comprising:
   an angle adjustment mechanism for rotating a shooting direction of the image pickup section on the one plane about an axis perpendicutar to a fold line at the intersection of the two planes of the folding information terminal.

5. The folding information terminal device as set forth in claim 4, wherein:
   the one plane is provided on either a main body or a covering body made up of (a) a movable section including the image pickup section, and (b) a fixed section separated from the movable section, and
   the angle adjustment mechanism moves the movable section from the fixed section so as to change shooting direction of the image pickup section.

6. The folding information terminal device as set forth in claim 5, wherein:
   the movable section is rotated about an axis extending in the width direction of the one plane.

7. The folding information terminal device as set forth in claim 5, wherein:
   the movable section is rotated about an axis extending in the length direction of the one plane.

8. The folding information terminal device as set forth in claim 1, wherein:
   the movable connection section includes a simple stopper mechanism for movably holding inclination of the one plane with respect to the other plane at an arbitrary stage of angle.

9. The folding information terminal device as set forth in claim 1, further comprising:
   an image information processing section for outputting plural pieces of image data having different color components, the plurality of pieces of image data being identical in number with said at least one image pickup section on one plane of the two planes and said at least one image pickup section on the other plane combined.

10. The folding information terminal device as set forth in claim 9, further comprising:
    an image providing section for displaying a plurality of images based on the plurality pieces of image data outputted by the image processing section.

11. The folding information terminal device as set forth in claim 10, wherein:
    the image providing section is made of a three-dimensional liquid crystal.

12. A folding information terminal device including two planes which become opposite to each other when the folding information terminal device is folded, comprising:
    at least one image pickup section on one plane of the two planes;
    at least one image pickup section on the other plane;

a movable connection section for connecting a fixed end of the one plane and a fixed end of the other plane;

an angle adjustment mechanism for rotating a shooting direction of the image pickup section on the one plane about an axis perpendicular to a fold line at the intersection of the two planes of the folding information terminal, wherein:

the one plane is provided on either a main body or a covering body made up of (a) a movable section including the image pickup section, and (b) a fixed section separated from the movable section, the angle adjustment mechanism moves the movable section from the fixed section so as to change shooting direction of the image pickup section, and the movable section is rotated about an axis extending in the width direction of the one plane; and a movable connection section for connecting a fixed end of the one plane and a fixed end of the other plane, and a distance between the image pickup section on the one plane and the movable connection section is different from a distance between the image pickup section on the other plane and the movable connection section.

13. A folding information terminal device including two planes which become opposite to each other when the folding information terminal device is folded, comprising:

at least one image pickup section on one plane of the two planes;

at least one image pickup section on the other plane;

an angle adjustment mechanism for rotating a shooting direction of the image pickup section on the one plane about an axis perpendicular to a fold line at the intersection of the two planes of the folding information tenninal, wherein:

the one plane is provided on either a main body or a covering body made up of (a) a movable section including the image pickup section, and (b) a fixed section separated from the movable section, the angle adjustment mechanism moves the movable section from the fixed section so as to change shooting direction of the image pickup section, the movable section is rotated about an axis extending in the length direction of the one plane, and the image pickup section on the one plane and the image pickup section on the other plane are asymmetrically placed with respect to a border of the one plane and the other plane.

* * * * *